United States Patent
Sudo et al.

(10) Patent No.: US 6,198,948 B1
(45) Date of Patent: *Mar. 6, 2001

(54) COMMUNICATION TERMINAL APPARATUS AND CONTROL METHOD THEREOF

(75) Inventors: Fukuharu Sudo; Takushi Kunihiro, both of Tokyo; Tetsuo Kobayashi, Kanagawa; Atsushi Ajiro; Kentaro Odaka, both of Tokyo; Tatsuji Ushino, Kanagawa; Toshiro Terauchi, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/339,751

(22) Filed: Jun. 24, 1999

Related U.S. Application Data

(62) Division of application No. 08/950,512, filed on Oct. 21, 1997, which is a division of application No. 08/421,945, filed on Apr. 13, 1995, now abandoned.

(30) Foreign Application Priority Data

Apr. 20, 1994 (JP) .................................................. 6-104350
Aug. 31, 1994 (JP) .................................................. 6-232327

(51) Int. Cl.[7] .............................. H04B 1/38; H04M 1/00
(52) U.S. Cl. ............................ 455/566; 455/90; 455/575
(58) Field of Search ..................................... 455/564, 566, 455/575, 90, 424, 550, 186.1, 95, 128, 154.1, 158.1, 351, 158.4; 379/428, 433–434, 367–368; 345/163, 167–169, 184; 463/37; 273/148 B

(56) References Cited

U.S. PATENT DOCUMENTS

| 4,885,771 | 12/1989 | Rabideau . | |
| 5,237,311 | * 8/1993 | Mailey et al. .................... 345/167 |
| 5,422,656 | * 6/1995 | Allard et al. ...................... 455/566 |
| 5,436,954 | * 7/1995 | Nishiyama et al. ............... 455/566 |
| 5,758,295 | * 5/1998 | Ahlberg et al. .................. 455/566 |
| 5,915,288 | * 6/1999 | Kunihiro et al. ................. 455/575 |
| 5,999,827 | * 12/1999 | Sudo et al. ....................... 455/566 |

FOREIGN PATENT DOCUMENTS

| 2012199 | 9/1991 | (CA) . |
| 9404084 | 4/1996 | (DE) . |
| 0463582 | 1/1991 | (EP) . |
| 0588210 | 3/1994 | (EP) . |
| 0602840 | 6/1994 | (EP) . |

* cited by examiner

*Primary Examiner*—Nguyen Vo
(74) *Attorney, Agent, or Firm*—Jay H. Maioli

(57) ABSTRACT

A communication terminal apparatus such as a portable telephone apparatus has a main body, a selection operation unit, an operation inputting unit, a display unit, and a controller. The main body has a speaker and a microphone. The selection operation unit is provided on the main body and selects one mode from a plurality of modes of the communication terminal apparatus. The control inputting unit is provided on the main body and changes functions based on the mode selected by the selection operation means. The display unit is provided on the main body and displays information required for selection operation or inputting operation by the selection operation unit and/or the operation inputting unit. The controller sets mode selected based on the input from the selection operation unit, and switches function of the operation input unit based on the input from the selection operation unit. The controller controls display operation of the display unit based on the input form the selection operation unit and/or the operation inputting unit.

8 Claims, 28 Drawing Sheets

FIG. 10 A

Input dial NO
13458_

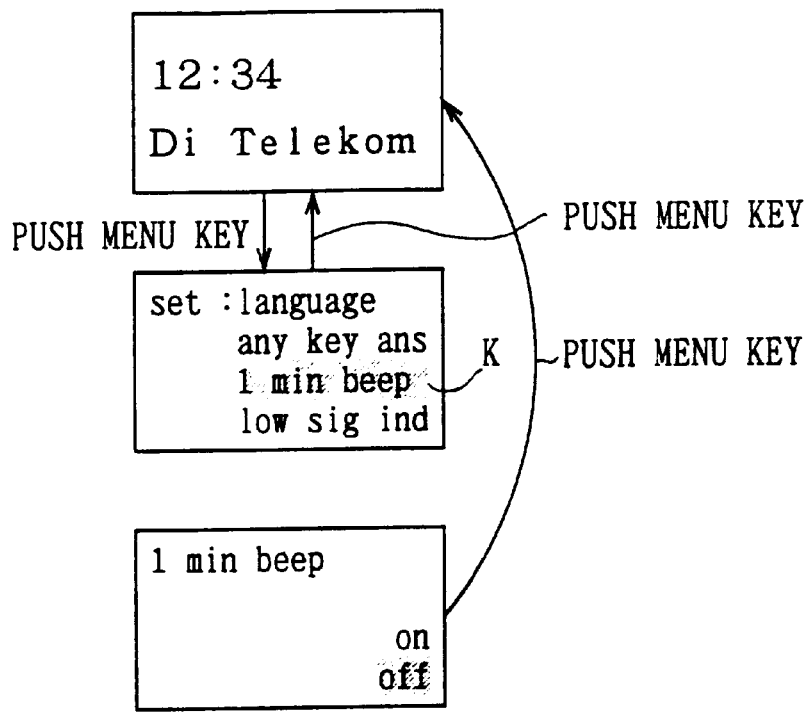
FIG. 11A
FIG. 11B
FIG. 11C
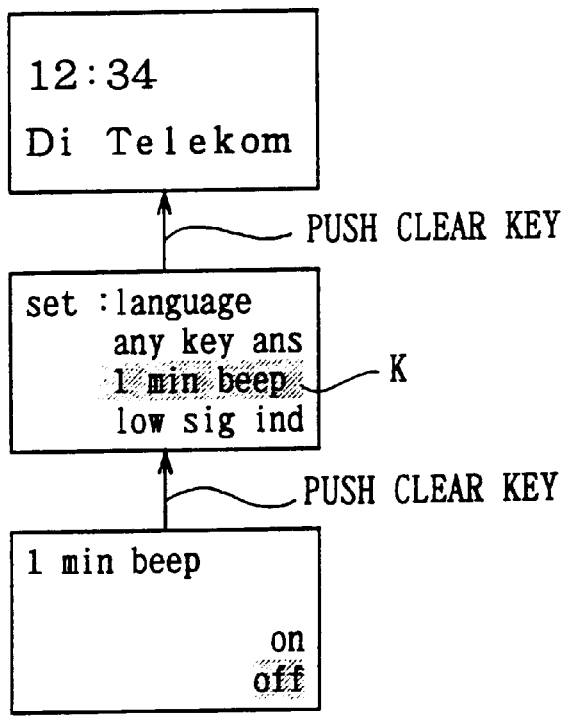
FIG. 12A
FIG. 12B
FIG. 12C

FIG. 13A
FIG. 13B
FIG. 13C
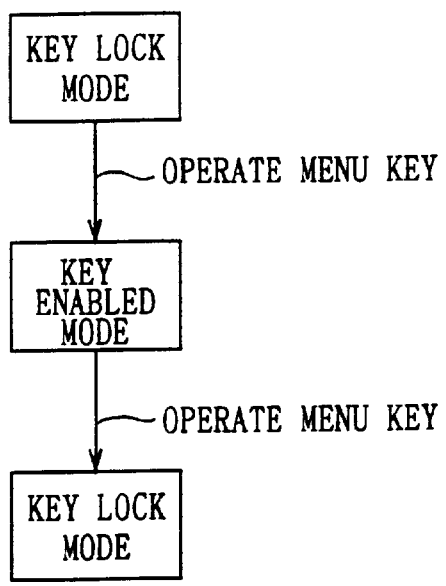
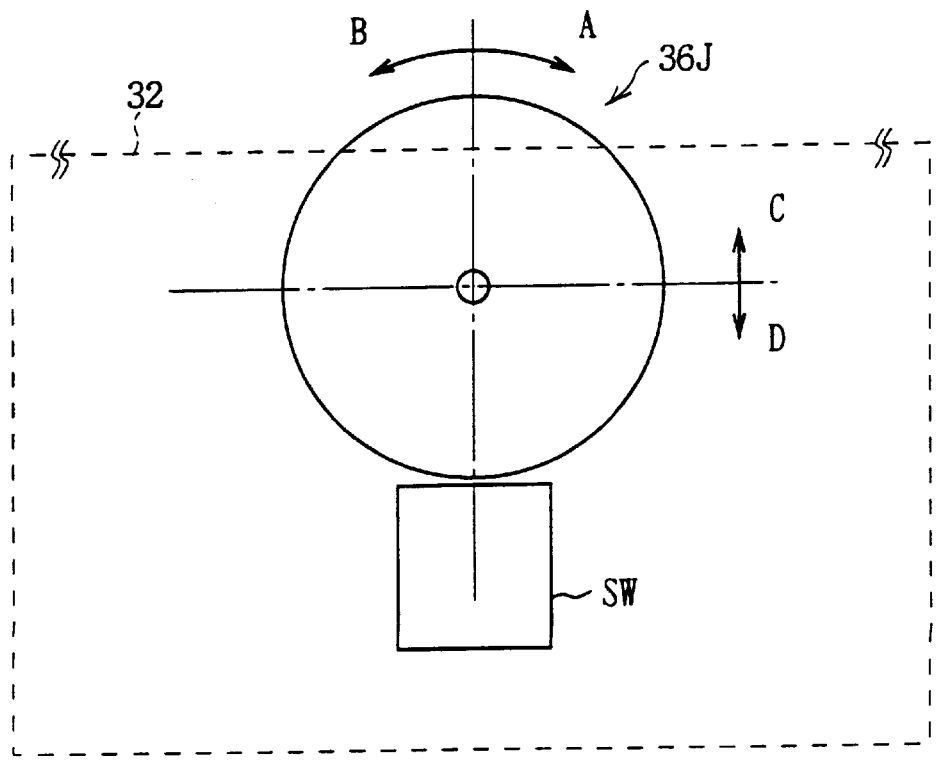
FIG. 14

```
1 Robert
2 George
3 Sally
4 Ilia
5 Jack
    .
    .
9 Nick
Alice
Bob
Cane
Dick
Ellis
    .
    .
Yang
```

COMMUNICATION TERMINAL APPARATUS AND CONTROL METHOD THEREOF

This is a division of prior application Ser. No. 08/950,512 filed Oct. 21, 1997, which is a division of application Ser. No. 08/421,945, filed Apr. 13, 1995, now abandoned.

BACKGROUND OF THE INVENTION

1. Field of the Invention

The present invention relates to a communication terminal apparatus and a control method thereof, and more particularly, to the communication terminal apparatus having a selection operation unit and the control method thereof.

2. Description of the Related Art

Communication terminal apparatuses such as portable telephones that particularly require portability are commonly used these days. In such communication terminal apparatuses, a single input key has a single function assigned thereto. That is, separate keys such as dial key, communication start key, communication end key, and redial key are assigned independently.

There are some communication terminal apparatuses in which a plurality of functions are assigned to a single input key. However, these functions are not selected by a user but automatically selected according to the state of the communication terminal apparatus. For example, a single input key is used for different operations according to operation state or operation mode of the communication terminal apparatus such as busy or waiting state.

However, if a single function is fixedly assigned to a single input key as described above, the number of input keys inevitably increases with increasing number of functions of communication terminal apparatus. In communication terminal apparatus using a single input key for different functions according to the operation state or the operation mode thereof, the number of input keys is not effectively reduced because functions to be assigned are limited. For example, only a set of functions used only during transmission or a set of functions used only during waiting state can be used for such duplicate assignment.

Further, in a portable communication terminal apparatus such as portable telephone that must have a small size, an increase in the number of input keys results in an increase in the size of the apparatus, and thus there occurs a problem of degraded portability.

Further, the increase in the number of input keys makes it more difficult to select an input key to be operated, which gives an impression that the equipment cannot be operated easily. In addition, there occurs the problem that the user often presses incorrect keys.

SUMMARY OF THE INVENTION

It is, therefore, an object of the present invention to provide a communication terminal apparatus which resolves the above-mentioned problem.

It is another object of the present invention to provide a control method of communication terminal apparatus which resolves the above-mentioned problem.

According to the present invention, there is provided a communication terminal apparatus including a selection operation unit and a operation input unit. The selection operation unit selects one mode from a plurality of mode of the communication terminal apparatus. The operation input unit changes its function based on the mode selected by the selection operation unit.

According to the present invention, there is provided a communication terminal apparatus including a main body, the selection operation unit, the operation input unit, and a display unit. The main body has a speaker and a microphone. The selection operation unit is provided in the main body to select one mode from a plurality of mode of the communication terminal apparatus. The operation input unit is provided in the main body to change its function based on the mode selected by the selection operation unit. The display unit is provided in the main body to display information which are required for at least the selection operation and/or the input operation by selection operation unit and/or operation input unit, respectively.

According to the present invention, there is provided a communication terminal apparatus including the main body, the selection operation unit, the operation input unit, the display unit, and a controller. The main body has the speaker and the microphone. The selection operation unit is provided in the main body to select one mode from a plurality of mode of the communication terminal apparatus. The operation input unit is provided in the main body to change its function based on the mode selected by the selection operation unit. The display unit is provided in the main body to display information which is required for at least selection operation and/or input operation by the selection operation unit and/or the operation input unit, respectively. The controller sets the mode selected based on the input from the selection operation unit, and switches function of the operation input unit based on the input from the selection operation unit. Also, the controller controls the display operation of the display unit based on the input from the selection operation unit and/or the operation input unit.

According to the present invention, there is provided a control method for the communication terminal apparatus having the selection operation unit for selecting one mode from a plurality of mode; the operation input unit for changing function based on the mode selected by the selection operation unit; the display unit for displaying information which is required for at least selection operation and/or input operation by the selection operation unit and/or the operation input unit, respectively; and a memory for storing a plurality of data of communicates including the telephone numbers and the names of the communicatees input by the operation input unit. The control method selectively displays a first display state for displaying the communicates assigned to the operation input unit based on the data stored in the memory, and a second display state for displaying the data stored in the memory in alphabetical order of the communicatee.

According to the present invention, there provides the operation input unit which can change function by operation from the selection operation unit, so that many functions can be selectively switched without increasing the number of keys required for input. Therefore, smaller communication terminal apparatus can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 10A to 10C are state transition diagrams explaining the switching of the fonts according to the number of input characters;

FIGS. 11A to 11C are schematic diagrams showing the switching of a display screen using a menu key;

FIGS. 12A to 12C are schematic diagrams showing the switching of a display screen using a clear key;

FIGS. 13A to 13C are schematic diagrams showing the switching of a mode using the menu key with a movable arm microphone closed;

FIG. 14 is a schematic plane view showing the approximate mechanism of a jog dial;

DETAILED DESCRIPTION OF THE EMBODIMENT

Preferred embodiments of the present invention will be described with reference to the accompanying drawings. Incidentally, in the following embodiments, description will be made by taking a portable telephone as an example of a communication terminal apparatus.

First, the following description is about the portable telephone according to the first embodiment of the present invention using FIGS. 1 to 5.

Figure 1:
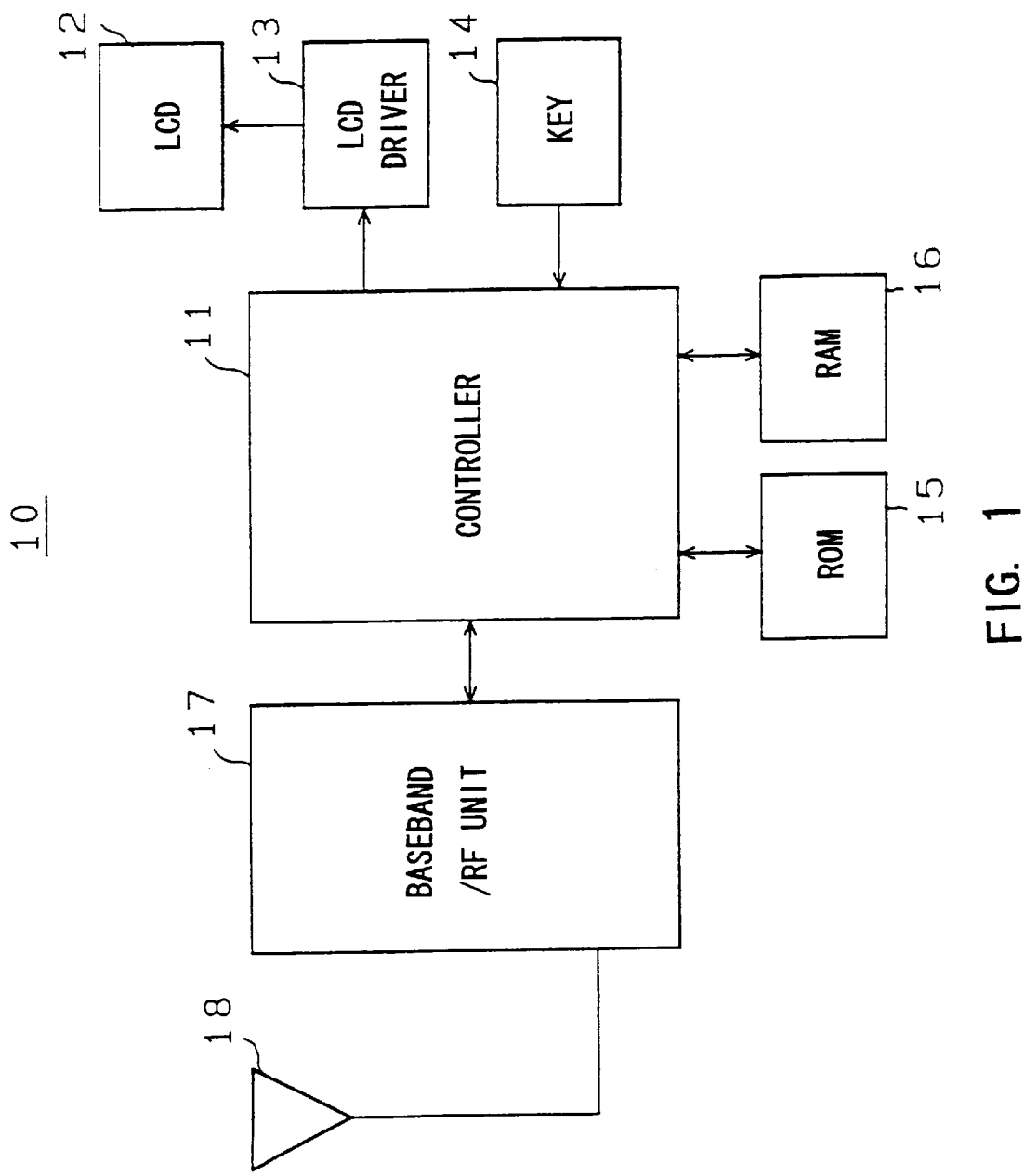
FIG. 1 is a block diagram showing the integral part of a portable telephone according to the first embodiment of the present invention.

FIG. 1 is a block diagram showing the integral part of the portable telephone according to the first embodiment. Reference numeral 10 shows the portable telephone. Reference numeral 11 is a controller for executing a terminal control program. Reference numeral 12 is a display unit composed of LCD (liquid crystal display) provided on a box, and 13 is a display driving circuit. The display data is supplied from the controller 11 to the display driving circuit 13, so that the display driving circuit 13 drives the display unit 12.

Reference numeral 14 shows an operation unit provided on the box. The operation information input by the operation unit 14 is supplied to the controller 11. Then, the controller 11 controls various operations such as communication and display operations based on the supplied operation information.

Reference numeral 15 shows a ROM (read only memory) for storing an operation program for the controller 11. Reference numeral 16 shows a RAM (random access memory) which is used for a working region when the program operation of the terminal control by the controller 11 is executed.

Reference numeral 17 shows a baseband and RF unit, which modulates transmitted signals and demodulates received signals. Reference numeral 18 shows an antenna for transmitting and receiving.

Figure 2:
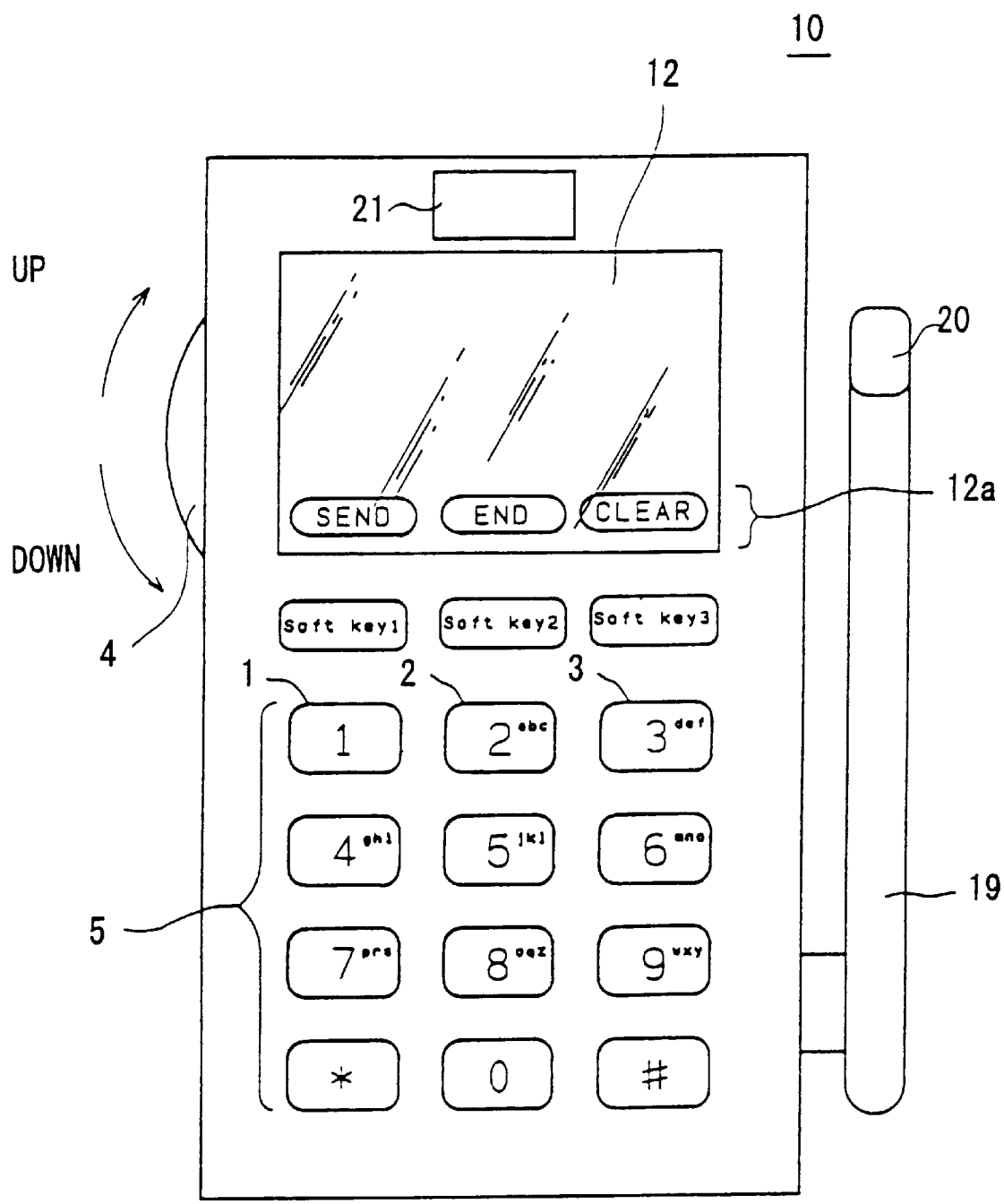
FIG. 2 is an external drawing showing the portable telephone according to the first embodiment at its default state.

The external construction of the portable telephone 10 is, for example, constituted as shown in FIG. 2. The display unit 12 is provided on one of main surface of the box to display various displays to the user. As the operation keys corresponding to the operation unit 14, a soft key 1, a soft key 2, a soft key 3, a scroll knob 4, and numeral/alphabet keys 5 used for dial call and character input are allocated. On one side of the box, the scroll knob 4 is provided so that the user can rotary operate. Further, on the other side of the box from where the scroll knob 4 is, a rotatable arm portion 19 is provided. A microphone 20 is provided on the free end of the arm portion 19. By turning upside of the arm portion 19 toward downside in FIG. 2, the user can talk on the telephone. Further, on the upside of the main surface of the box, a speaker 21 is provided in which the demodulated signal from the baseband/RF unit 17 is supplied.

The soft keys 1, 2, and 3 have their functions varied according to the state set by the scroll knob 4. The current function of each of the soft keys 1, 2, and 3 is displayed in a function display region 12a of the soft keys in the display unit 12. As shown in FIG. 2, the function display region 12a of the soft keys is located close to the positions of the soft keys 1, 2, and 3, so that the user can easily understand the current function of each of the soft keys 1, 2, and 3.

The scroll knob 4 is constituted as a rotatable knob in the up and down directions indicated by the arrows in FIG. 2. When rotating the scroll knob 4, the user feels that the scroll knob 4 is, for example, clicked so as to sense the rotational stages.

FIG. 2 shows a default state wherein the user does not operate the scroll knob 4. In this state, the following words are displayed on the function display region 12a of the soft keys to show the function of each of the soft keys 1, 2, and 3: the words "SEND" meaning a call operation in response to the soft key 1: "END" meaning a communication end operation in response to the soft key 2; and "CLEAR" meaning a clear operation of input numerals in response to the soft key 3.

Figure 3:
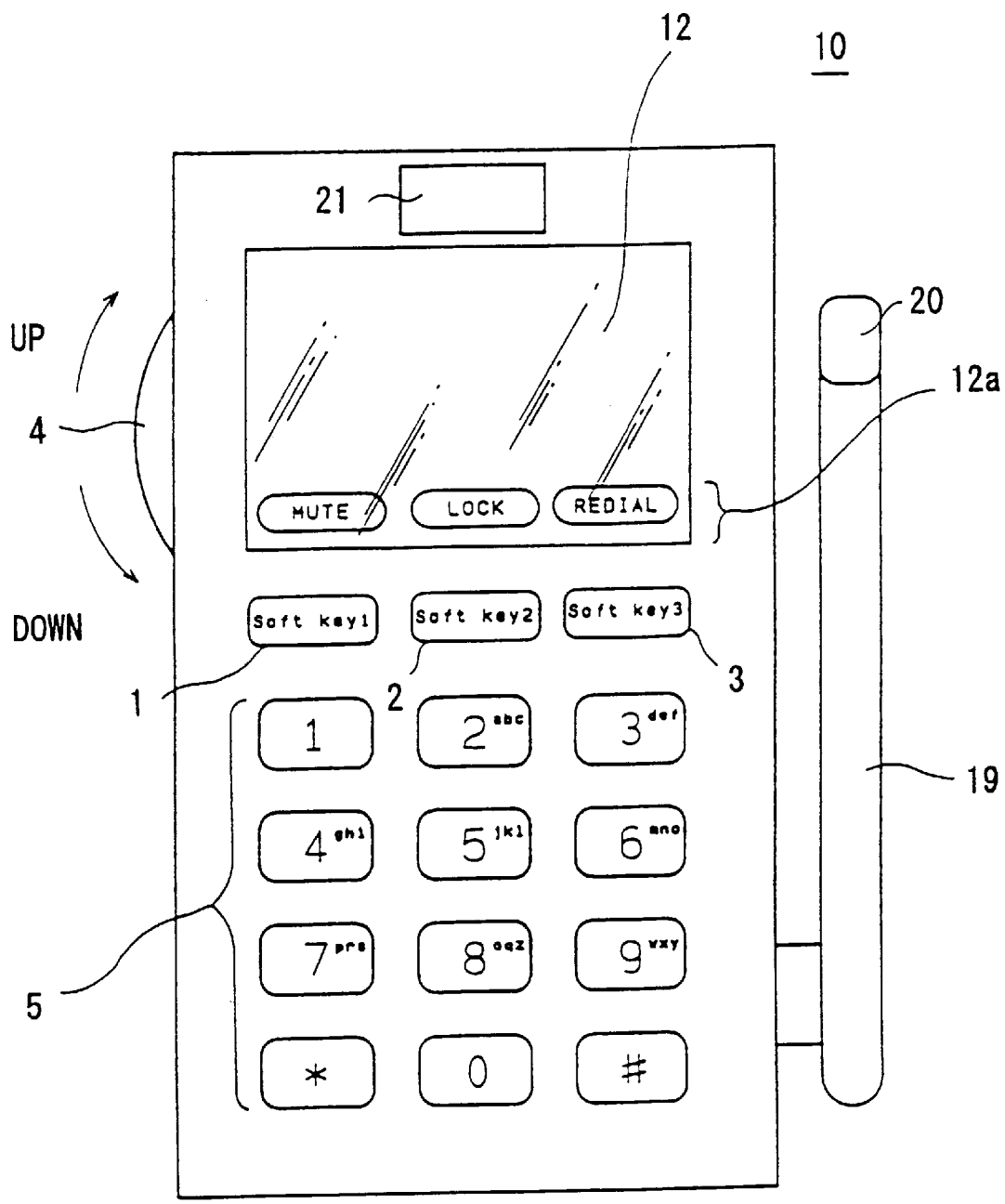
FIG. 3 is an external drawing showing the portable telephone according to the first embodiment at its state A.

When the scroll knob 4 is rotated downward, the controller 11 regards that the default state has shifted to the next state (assume that it is "state A") and that the functions of the soft keys 1, 2, and 3 have been changed. As shown in FIG. 3, the following words are displayed in the function display region 12a of the soft keys to show the function of each of the soft keys 1, 2, and 3 in state A: the words "MUTE" meaning a mute operation which mutes the sound output from the speaker 21 in response to the soft key 1; "LOCK" meaning a key lock operation in response to the soft key 2; and "REDIAL" meaning a redial operation in response to the soft key 3.

Figure 4:
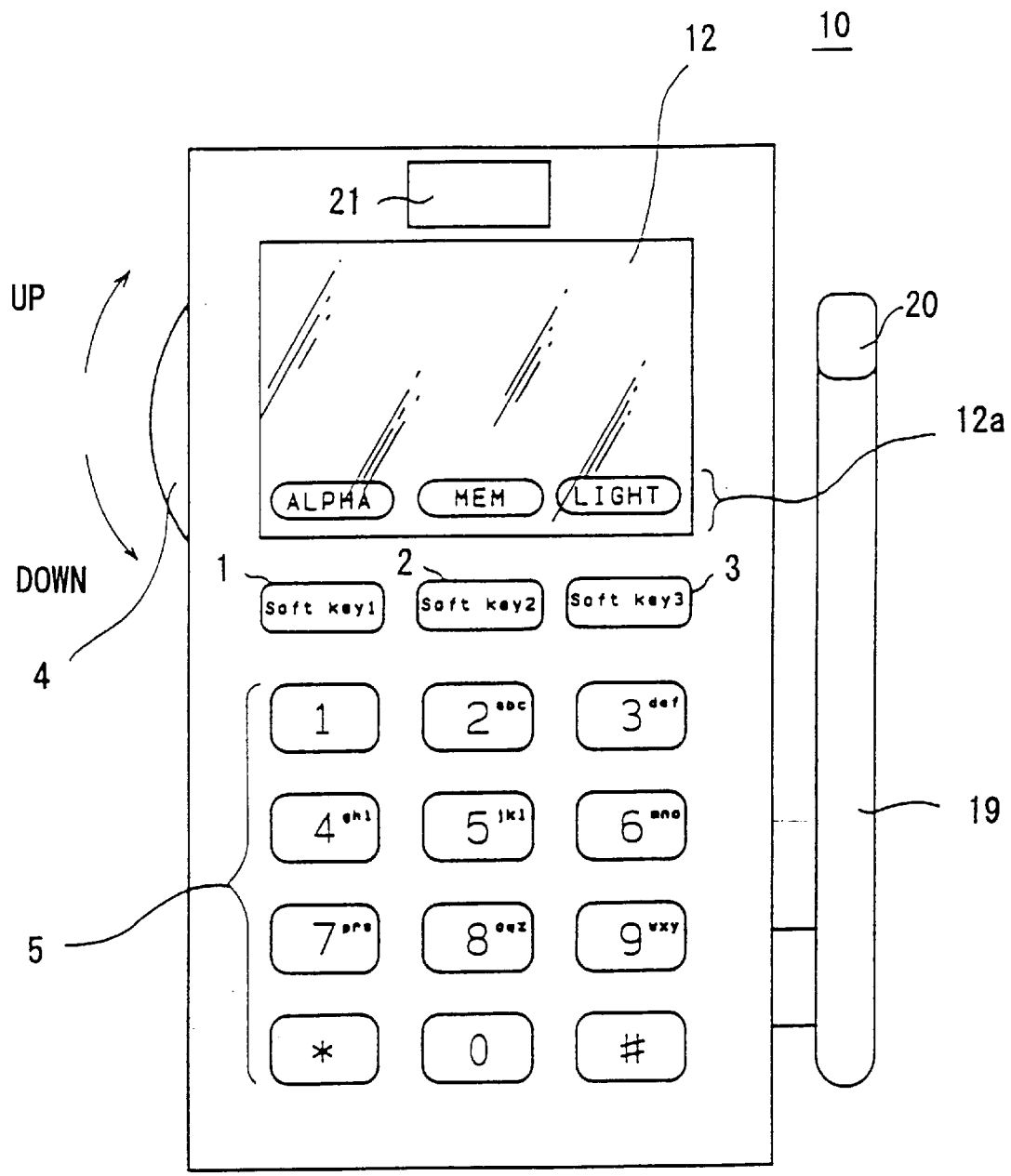
FIG. 4 is an external drawing showing the portable telephone according to the first embodiment at its state B.

When the scroll knob 4 is further rotated downward in state A, the controller 11 regards that state A has shifted to the next state (assume that it is "state B"), and further changes the functions of the soft keys 1, 2, and 3. As shown in FIG. 4, the following words are displayed in the function display region 12a of the soft keys to show the function of each of the soft keys 1, 2, and 3 in state B: the words "ALPHA" meaning an alphabet input call operation in response to the soft key 1; "MEM" meaning a memory call operation in response to the soft key 2; and "LIGHT" meaning a back light operation in response to the soft key 3.

In state B in FIG. 4, when the scroll knob 4 is rotated upward for one level, the state is returned to state A in FIG. 3. When the scroll knob 4 is further rotated upward, the state is returned to the default state. In this manner, the controller 11 controls the display of the display unit 12 and the switch of each part based on the input operation from the scroll knob 4.

If no operation has been performed for a specified length of time being in state A or B, the controller 11 controls to automatically return to the default state shown in FIG. 2

In this manner, aforementioned three states is selected by the scroll knob 4 and the function of each of the soft keys 1, 2, and 3 are switched. Each of the soft keys 1, 2, and 3 thus can be used as the operation keys corresponding to the three functions.

Figure 5:
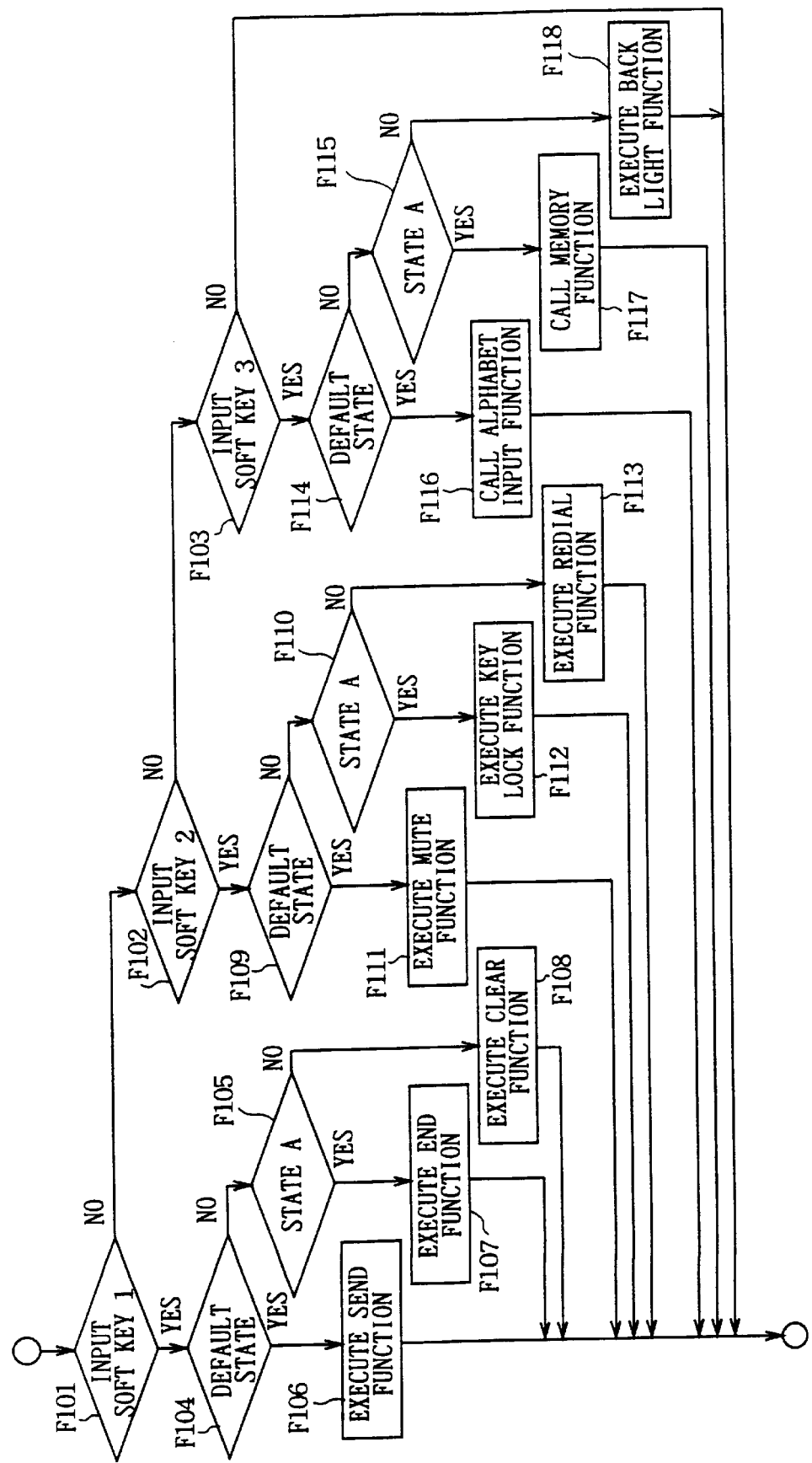
FIG. 5 is a flowchart showing processing corresponding to soft keys of the portable telephone according to the first embodiment.
Figure 6:
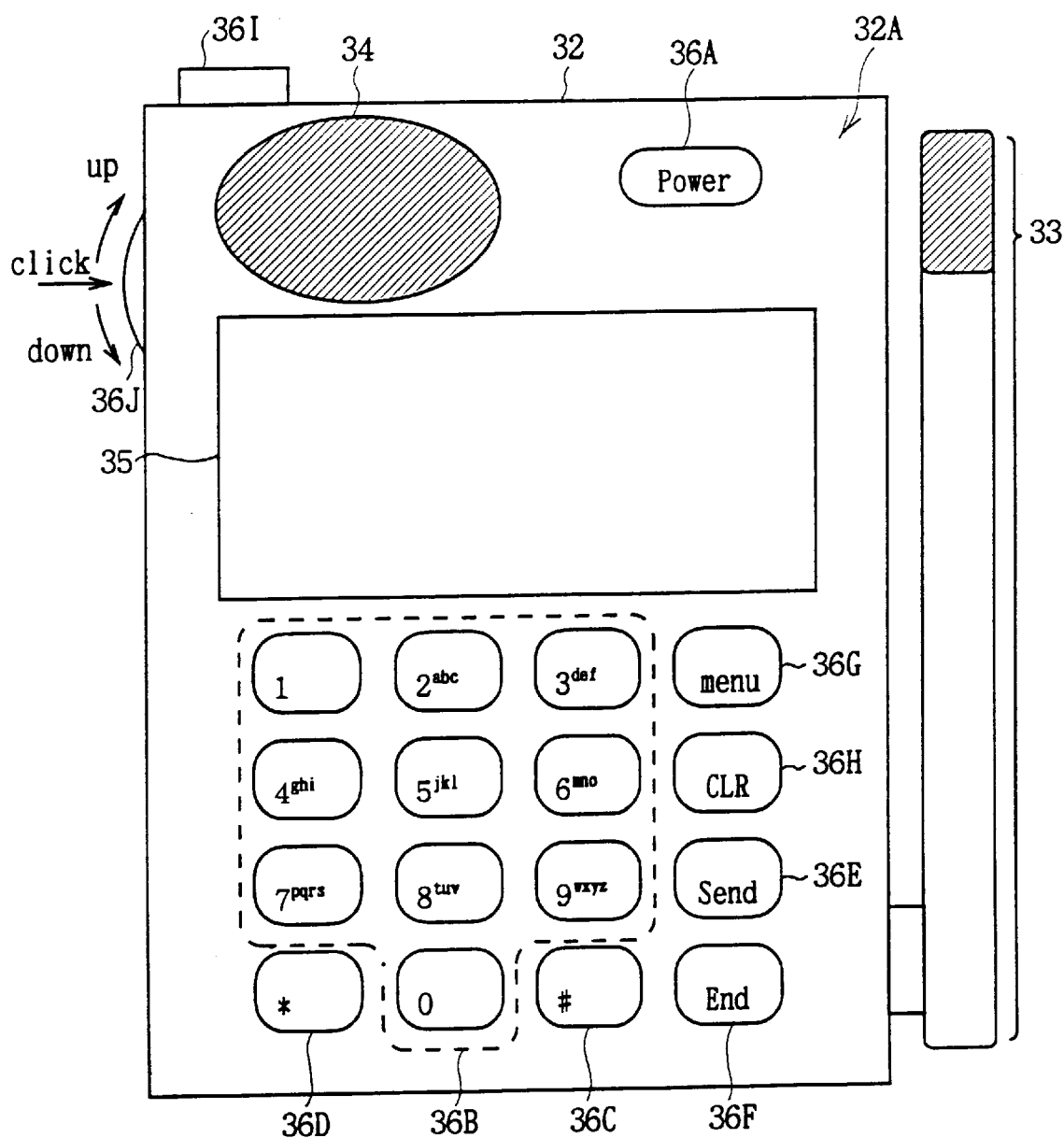
FIG. 6 is a schematic front view showing a second embodiment of the portable telephone as a communication terminal apparatus according to the second embodiment of the present invention.
Figure 7:
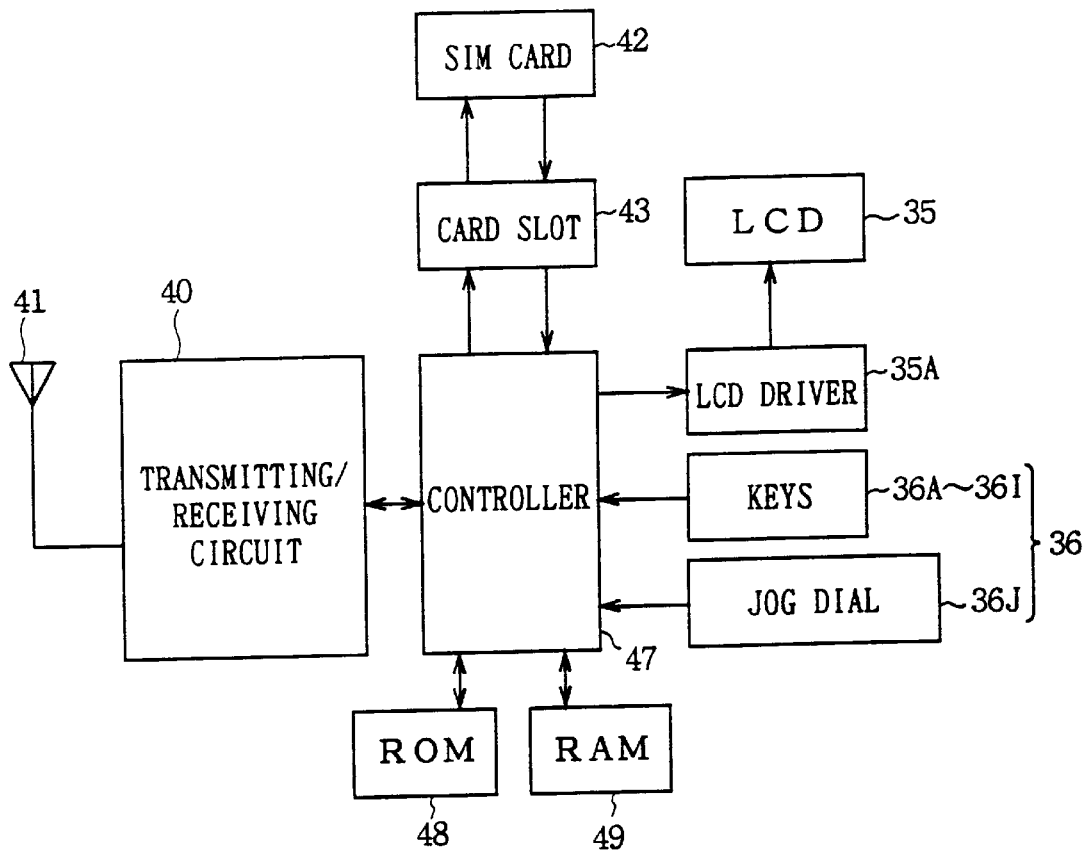
FIG. 7 is a block diagram showing the configuration of the integral part of the communication terminal apparatus according to the second embodiment.

The controller 11 executes predetermined operation control based on the input from the soft key 1, 2, or 3. The processing in the case where the soft key 1, 2, or 3 is pressed is shown in FIG. 5. The processing flow shown in FIG. 5 is stored in the ROM 15 connected to the controller 11.

If the soft key 1 is pressed (F101), the controller 11 determines whether or not the current state is default, A, or B (F104, F105). If the state is default, the controller 11 executes the send operation control (F106). If the state is A, the controller 11 executes the end operation control (F107). If the state is B, the controller 11 executes the clear operation control (F108).

Similarly, when the soft key 2 is pressed (F102), the controller 11 first determines whether or not the current state is defaults, A, or B (F109, F110). If the state is default, the controller 11 executes the mute operation control (F111). If the state is A, the controller 11 executes the key lock operation control (F112). If the state is B, the controller 11 executes the redial operation control (F113).

Similarly, when the soft key 3 is pressed (F103), the controller 11 determines whether or not the current state is default, A, or B (F114, F115). If the state is default, the controller 11 executes the alphabet input function call control (F116). If the state is A, the controller 11 executes the memory function call control (F117). If the state is B, the controller 11 executes the back light operation control (F118).

As described above, the user can select the functions of the soft keys 1, 2, and 3 by the scroll knob 4, and the controller 11 controls the functions set according to the current state, so that various operations can be executed with a small number of keys. Therefore, it is possible to realize the portable telephone with a large number of functions as well as being in miniature.

Furthermore, the functions which are used most frequently, such as send function, end function, and clear function, are set in the default state, and the functions which is relatively not used very much, such as alphabet input function, memory call function, and back light function, are set in state B, so that the user can use the portable telephone at a minimum of operation of the scroll knob 4. Therefore, the simplicity of the operation can be improved.

Furthermore, if the keys are not operated over a specified length of time, the state is automatically returned to the default, and the soft keys 1, 2, and 3 are set to the functions such as send function and end function which are frequently used. Therefore, the usability can be further improved.

In addition, since the functions of the soft keys 1, 2, and 3 in each state are displayed in the function display region 12a of the soft keys in the display unit 12, the user can visually check what functions the soft keys are currently, thus can operate the portable telephone with no confusion.

The present invention is not only limited to the first embodiment, but various modifications can be made thereto instead. For example, the number of the soft keys may be one, four or more. In addition, the states selected by the scroll knob are not only limited to the three states (default, A, and B), but may be two, four or more.

In addition, the functions set for the soft keys and the design specification based on the use frequency are not only limited to the embodiment, but can be determined according to the usage of the apparatus and mounted functions.

Furthermore, in the embodiment, the scroll knob 4 is used as a selection operation unit. However, other operation means such as press keys may be used.

Next, the detailed description about the portable telephone as a communication terminal apparatus according to the second invention of the present invention will be made below.

(1) Overall Construction (1-1) Body of Apparatus

The overall configuration and the circuit configuration of a portable telephone apparatus 31 are described using FIGS.

6 and 7, respectively. The portable telephone apparatus 31 is composed of a main body 32 and an arm microphone 33 attached to its side rotatably and freely opening or closing. Thus, by closing the arm microphone 33, the portable telephone apparatus 31 can further be miniaturized.

The arm microphone 33 has the function for controlling on or off hook in response to the opening and closing operation, and the function for disabling operations by keys other than specified ones during the close state (referred to as a "key lock function"). This key lock state can be released by opening the arm microphone 33. This prevents erroneous transmission and receiving calls due to malfunctioning.

On the other hand, the main body 32 has various operation keys and a processing circuit. On one of the main surface of the main body 32, a speaker 34 paired with the arm microphone 33, a display unit 35 composed of liquid crystal display elements, and a plurality of operation keys 36 to which various functions are assigned are provided. Inside of the main body 32, a controller 47 composed of a micro computer in which data is input and output to and from the speaker 34, the display unit 35, and the plurality of operation keys 36 is provided.

The controller 47 controls the display unit 35 via a display driving circuit 35A to display information corresponding to the instruction input from the operation keys 36 using a font of an appropriate size.

The controller 47 operates based on programs stored in a ROM 48 and data read into a RAM 49. The controller 47 also controls a transmitting/receiving circuit 40 to transmit and receive information to and from other communication terminals via an antenna 41 connected to the transmitting/receiving circuit 40. The controller 47 has a card socket 43 connected thereto, and reads out all the management information on a subscriber from a subscriber ID card 42 (in the second embodiment, a Subscriber Identity Module (SIM) card 42 is described) inserted into the card socket 43.

The program and the control data is stored in the ROM 48, by which the controller 47 executes and controls the operation of the portable telephone for displaying and calling according to the second embodiment described later.

Figure 8A:
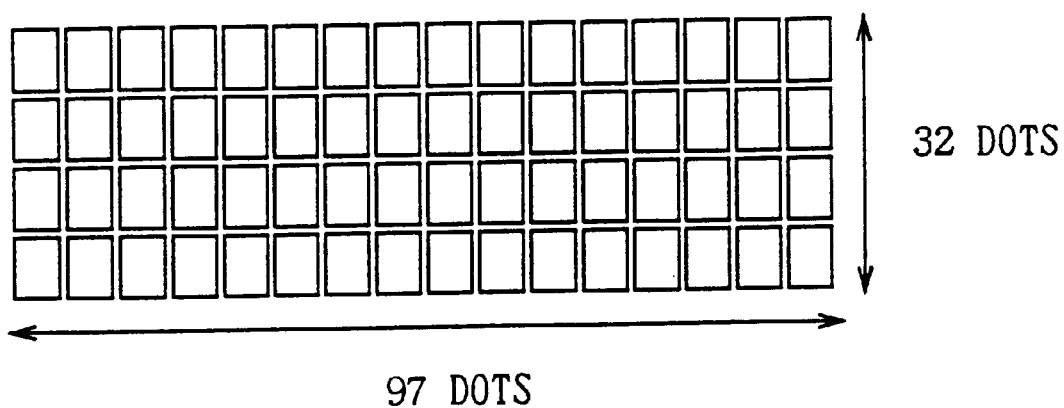
FIGS. 8A and 8B are schematic diagrams explaining a small font.
Figure 8B:
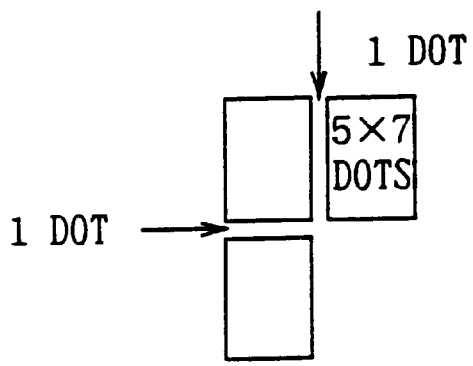
Figure 9A:
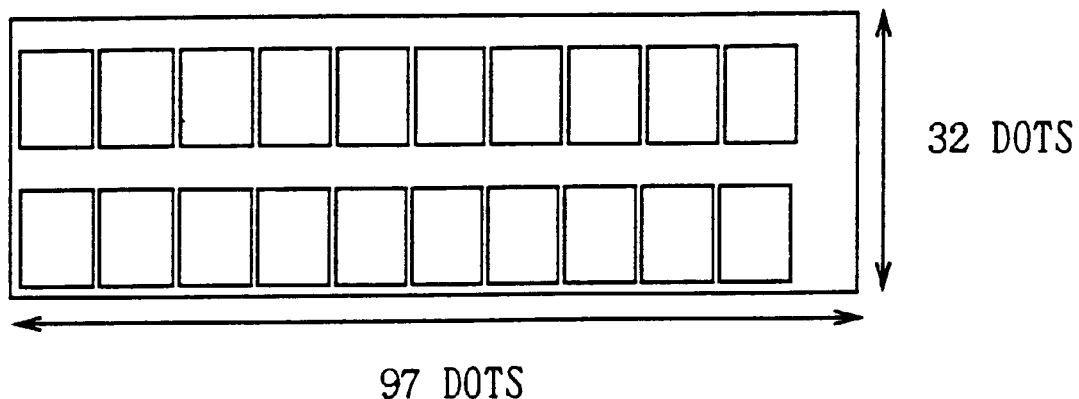
FIGS. 9A and 9B are schematic diagrams explaining a large font.
Figure 9B:
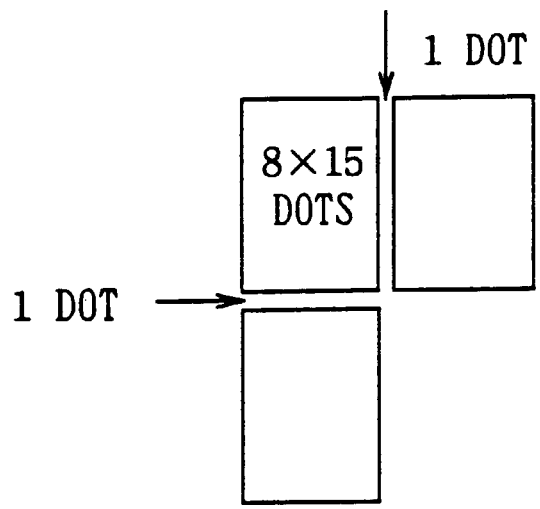

As shown in FIG. 8A, the display unit 35 used in the second embodiment has pixels of 32×97 dots arranged on the display surface thereof as a matrix to display information using two types of fonts. One of the fonts is a small font for displaying a single character with 5×7 dots, as shown in FIG. 8B, and the other is a large font for displaying a single character with 15×8 dots, as shown in FIG. 9A and 9B. Therefore, four characters lengthwise and sixteen characters breadthwise can be displayed by using the small font, and two characters lengthwise and ten characters breadthwise can be displayed by using the large font.

The large font is in principle used to display characters input by the user, and the small font is used to display messages from the apparatus. If the number of characters input by the user exceeds the specified number of characters (twenty characters), the font size is switched from large to small font.

An example of display is shown in FIGS. 10A to 10C. As shown in FIG. 10A, while the number of input characters is ten or less, characters input by the user are sequentially displayed in the large font below a small font message "input dial No". When number of the input character exceeds ten, the first ten characters are displayed in the upper line in the large font instead of the message, and 11th and subsequent characters are displayed below these ten characters in the large font, as shown in FIG. 10B. When the number of input characters reaches and then exceeds twenty, all the input characters are displayed in the small font, as shown in FIG. 10C.

In this manner, the font switching function is provided, so that the user can input large characters with checking the contents of the input while the number of input characters is small. Thereby, the opportunities of erroneous inputs can be reduced. If the number of input characters is large, this function enables input information on the same item to be checked on a single screen. This allows the contents of the input to be easily understood.

(1-2) Operation Key

Next, the operation keys 36 provided on the main body 32 are described. In the second embodiment, the operation keys 36 are composed of the following ten keys: a power supply key 36A, numeric keys 36B corresponding to "0" to "9", a "#" key 36C, a "*" key 36D, a send key 36E, an end key 36F, a menu key 36G, a clear key 36H, a recording key 36I, and a jog dial 36J. Eight operation keys 36A to 36H out of these keys are located on one of the main surface of the main body 32, and the remaining two operation keys 36I and 36J are located on side of the main body 32.

Main functions assigned to the respective operation keys are as follows. The power supply key 36A is used to supply power to the internal circuit in the main body 32. When the power supply key 36A is pressed once, the power is supplied to the apparatus, and when the power supply key 36A is pressed twice, the power supply is turned off. If the user has not input a PIN (Personal Identity Number) for thirty seconds after the power was supplied by the power supply key 36A, the controller 47 detects the circumstance and automatically turns off the power. In this manner, it is possible to prevent the power from continuing to be supplied during malfunctioning.

Next, the description will be made about the ten numeric keys 36B. These ten numeric keys 36B are used to input numbers and alphabets and to select the numbers. In this embodiment, a plurality of alphabets are assigned to eight numeric keys "2" to "9" other than the "0" and "1" so that alphabets can be input by these keys. For example, "a" to "c" are assigned to a numeric key "2", "d" to "f" are assigned to a numeric key "3", and the other alphabets are assigned to the other corresponding numeric keys.

When inputting alphabets, pressing a numeric key once enables the first character to be input, pressing same key twice enables the second character to be input, and pressing same key third times enables the third character to be input. The numeric key 36B can also be used to select display items, and to execute an abbreviated dialing function in which instruction is performed to start calling to the communicates corresponding to the numeric key by continuously pressing for a specified length of time (one second) on the display screen of the telephone book list.

The send key 36E is used to instruct to start calling to a communicatee selected from the display screen of the telephone book list, and to call the past dial history.

The end key 36F is used to instruct to end communication. Incidentally, communication can also be ended by closing the arm microphone 33.

The menu key 36G is used to switch between an initial screen and a menu screen that are displayed on the display unit 35. For example, assuming the screen shown in FIG. 11A is the initial screen, when the menu key 36G is pressed while this initial screen is being displayed, the display can be switched to a menu screen as shown in FIG. 11B. Further, this screen can also be switched to another screen as shown in FIG. 11C as if paging the screen, by using a scroll function described below. If, however, the menu key 36G is pressed while a menu screen is being displayed, the display immediately returns to the initial screen, whatever the menu screen may be. By using the clear key 36H, the display can be returned to a previous screen as if pages were turned, as shown in FIGS. 12A to 12C.

The menu key 36G have a function as the only key for releasing the key lock state. More specifically, as shown in FIGS. 13A and 13B, even when the arm microphone 33 is closed, the key lock state can be released to shift to a key active state by pressing the menu key 36G.

On the other hand, as shown in FIGS. 13B and 13C, if the menu key 6G is pressed while the arm microphone 33 is closed and while a menu screen is displayed, the state returns to the key lock state.

If no operation has been executed for thirty seconds since a menu screen was displayed, the control 47 detects this and closes the menu screen to return to the initial screen. In this case, if the arm microphone 33 is closed, the state returns to the key lock state. This prevents from malfunctioning.

The recording key 36I is used to control the recording of conversations during communications and the subsequent reproduction thereof, and is equipped on the upper surface of the main body 32 and opposite to the arm microphone 33 so that the user can operate this key using the hand grasping the main body 32.

The following description is about the jog dial 36J having a central function out of the ten operation keys. The jog dial 36J is provided on the upper part of one of the side of the main body 32, near the speaker 34, which is located opposite to the arm microphone 33. As in the recording key 36I, the user can operate the jog dial 36J using the hand grasping the main body 32.

The jog dial 36J can be operated either in the circumferential direction or in the radial direction, respectively, and is composed of a disc-shaped member (constituting a rotary encoder) that rotates in the circumferential direction (indicated by arrows "A" and "B") with an axis of rotation O as the central, a slide plate (not shown) that can slide in the radial direction (indicated by arrows "C" and "D"), and a slide switch SW, as shown in FIG. 14. The slide plate and the slide switch SW are subjected to force in direction C. The slide switch SW is operated by which the rotary encoder or the disc-shaped member is operated in the direction of D; pressed in the direction of going into the main body 32.

The axis of rotation O is fixed to the slide plate. When the jog dial is pressed in direction of the arrow D, the rotary encoder and the jog dial are slid en bloc to press operate the switch SW, and the switch SW is switched to the "ON" state. The controller 47 determines whether or not the jog dial 36J has been clicked, that is, press operated by detecting the "ON" or "OFF" state of the switch SW based on the output signal from the switch SW.

Figure 15A:
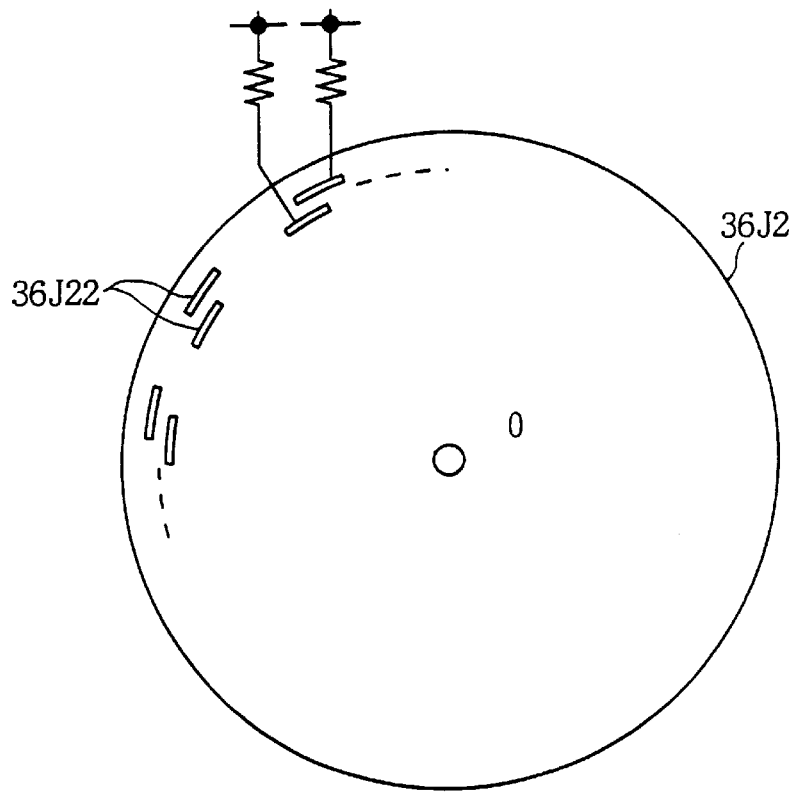
FIGS. 15A and 15B are plane views showing the configuration of rotary encoder.
Figure 15B:
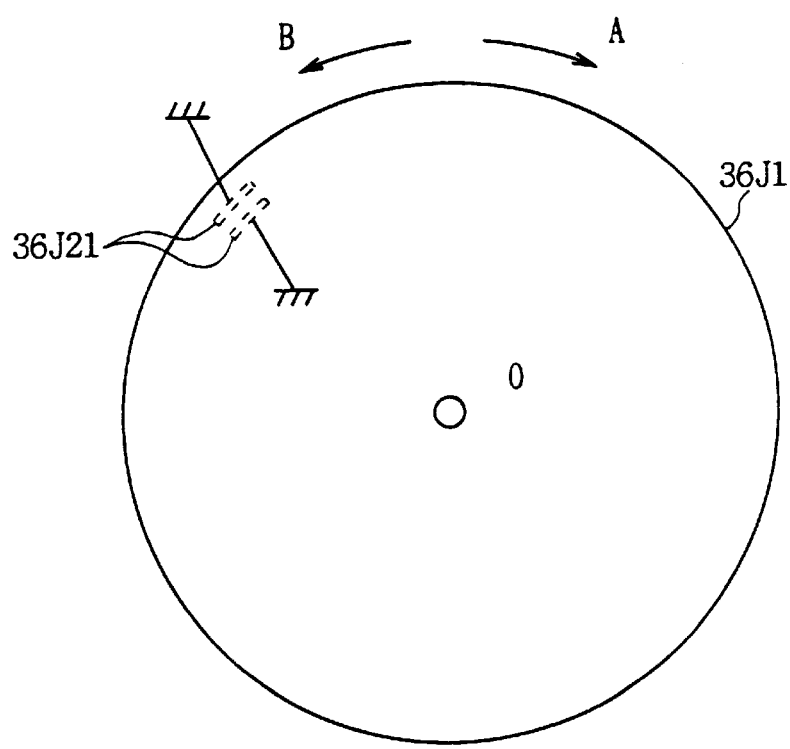

The rotary encoder slid en bloc with the slide plate is composed of two discs 36J1 and 36J2, as shown in FIGS. 15A and 15B. The disc 36J1 is a movable member covering the upper surface of the disc 36J2, and is equipped so that it can be rotated relative to the disc 36J2 fixed to the slide plate. The movable disc 36J1 has a pair of facing electrodes 36J21. When assembled, the pair of opposite electrodes 36J21 slidably contact twenty pairs of facing electrodes 36J22 provided along the circumference of the disc 36J2. Incidentally, the facing electrodes 36J22 provided to the fixed side of disc 36J2 are formed in such a way that the positions of the inner and the outer circumferential electrodes are slightly shifted.

Figure 16A:
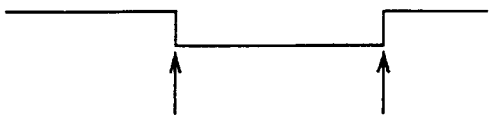
FIGS. 16A and 16B are signal waveform diagrams showing output waveforms by the rotary encoder.
Figure 16B:

Thus, when the jog dial is rotated in direction of arrow A shown in FIG. 15B, the electric potential of the inner track side output from the facing electrodes falls earlier to the earth potential, as shown in FIG. 16A. On the other hand, when the jog dial is rotated in direction of arrow B in FIG. 15B, the electric potential of outer the track side output from the facing electrodes falls earlier relative to the earth potential, as shown in FIG. 16B. In this manner, the controller 47 detects which electric potentials of the inner and outer track falls earlier, so that the rotational direction of the jog dial 36J can be detected. In addition, the number of pulses output from the outer track electrode is counted by a counter in the controller 47, the number of rotations of the jog dial 36J thus can be detected.

Next, a typical example of operation of the portable telephone using the jog dial 36J is described. When a list screen is displayed on the display unit 35, the cursor K displayed on the display unit 35 can be moved vertically by rotating the jog dial 36J circumferentially upward or downward, thereby one of the display items displayed on the display unit 35 can be selected. In this state, pressing the jog dial 36J in the radial direction, that is, in the direction of going into the main body 32 (hereinafter, this operation is referred to as "clicking") makes it possible to input a read-out command for detailed information concerning the item at which the cursor K is to the controller 47.

In addition, in the case where the telephone book list is displayed, by pressing the jog dial 36J continuously for a specified length of time, the user can instruct the controller 47 to initiate a call. As described above, the rotary encoder of the jog dial 36J press operates the switch SW, and it is detected whether or not the jog dial 36J has been press operated for a specified length of time by the controller 47 based on the output signal from the switch SW. Incidentally, by rotating the jog dial 36J in the circumferential direction during communications, the volume (reception volume) can be adjusted. This is operated by detecting the direction and the number of rotation of the jog dial 36J by the controller 47 to control volume output from the speaker 34 based on the output signal output from the rotary encoder of the jog dial 36J as shown in FIGS. 16A and 16B. Also, the mute operation can be performed by clicking the jog dial 36J during communications. Since the switch SW of the jog dial 36J is press operated by being clicked the jog dial 36J, the controller 47 executes the mute operation to the signal supplied to the speaker 34 based on the output signal from the switch SW. Therefore, the mute operation is performed.

Figure 17:
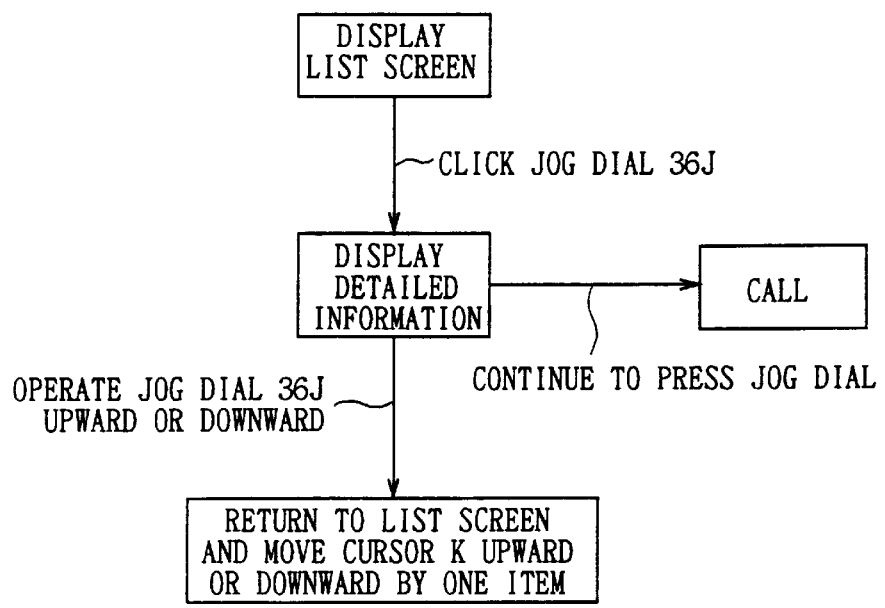
FIG. 17 is a state transition diagram showing the switching of the display screen using the jog dial.

FIG. 17 is a flowchart showing a typical example of the use of the jog dial 36J during an outgoing call.

By being clicked the jog dial 36J while a list screen such as the telephone book or a redial screen is displayed, it is possible to display detailed information concerning the selected item on the screen. If the jog dial 36J is clicked continuously for a specified length of time, it can be initiated to call automatically to the communicates displayed where the cursor is. If the jog dial 36J is rotated to move the cursor K upward or downward, it can be returned to the original list screen.

(2) Call/Editing (2-1) Call

Figure 18:
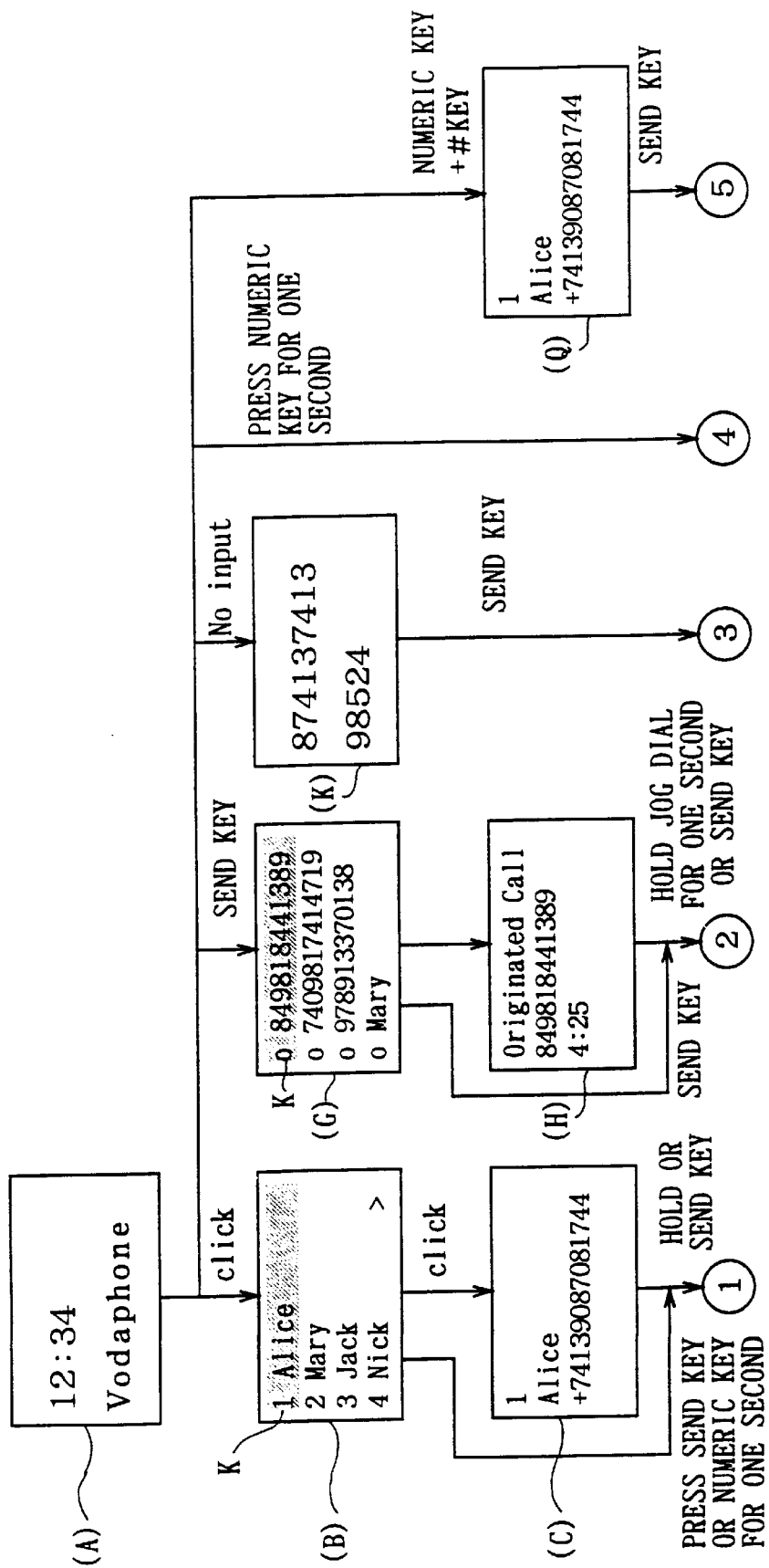
FIGS. 18 and 19 are state transition diagrams explaining various calling procedures.
Figure 19:
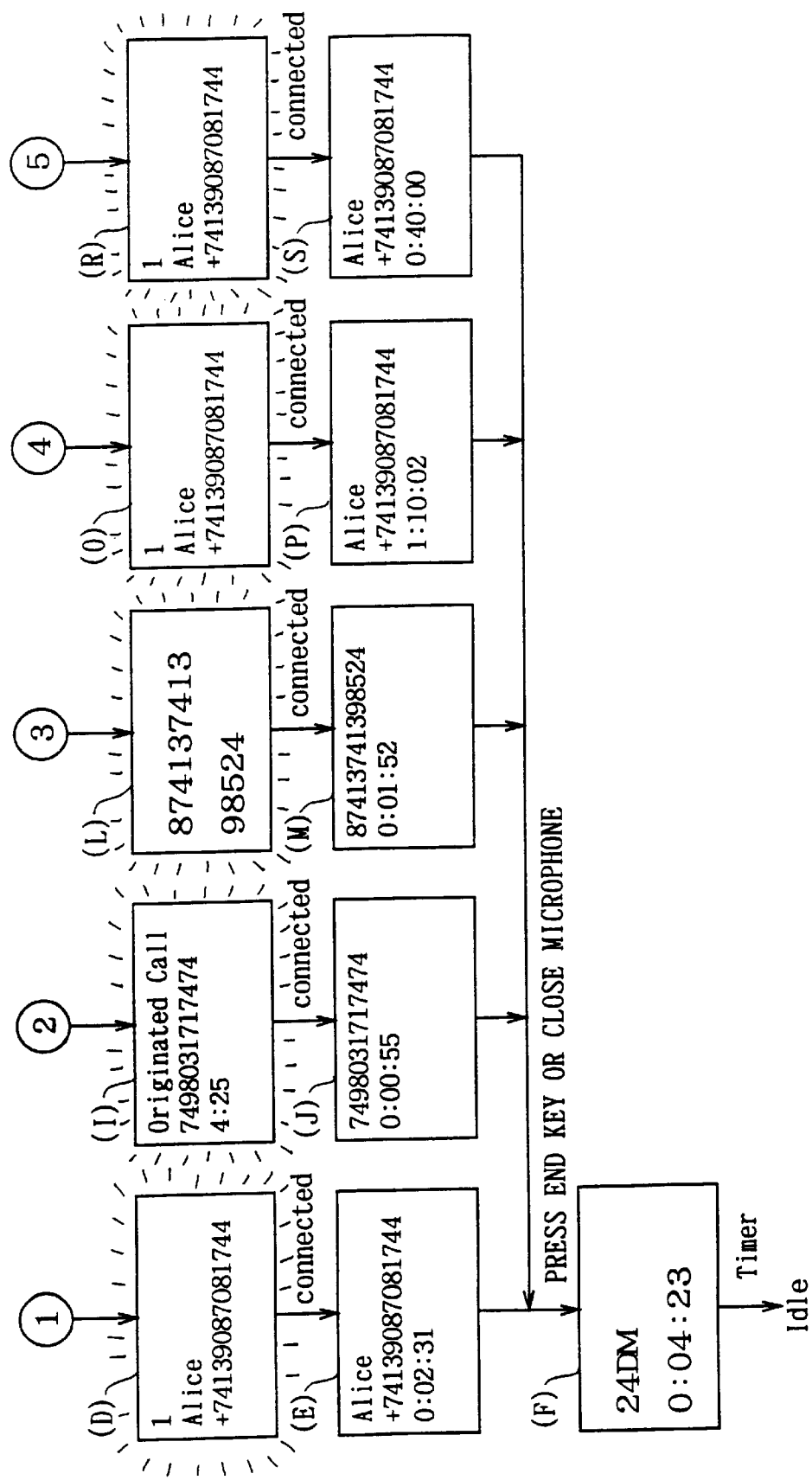

In this section, various calling methods provided for the portable telephone apparatus 31 are described. This portable telephone apparatus 31 has five calling methods as shown in FIGS. 18 and 19. These methods can be classified into a calling method using the telephone book list, a calling method using a redial function, a calling method of directly input telephone number, and a calling method using the abbreviated dialing function. The method of calling from the screen of the telephone book list is first described.

(2-1-1) Call from the Telephone Book List Screen

Figure 20:
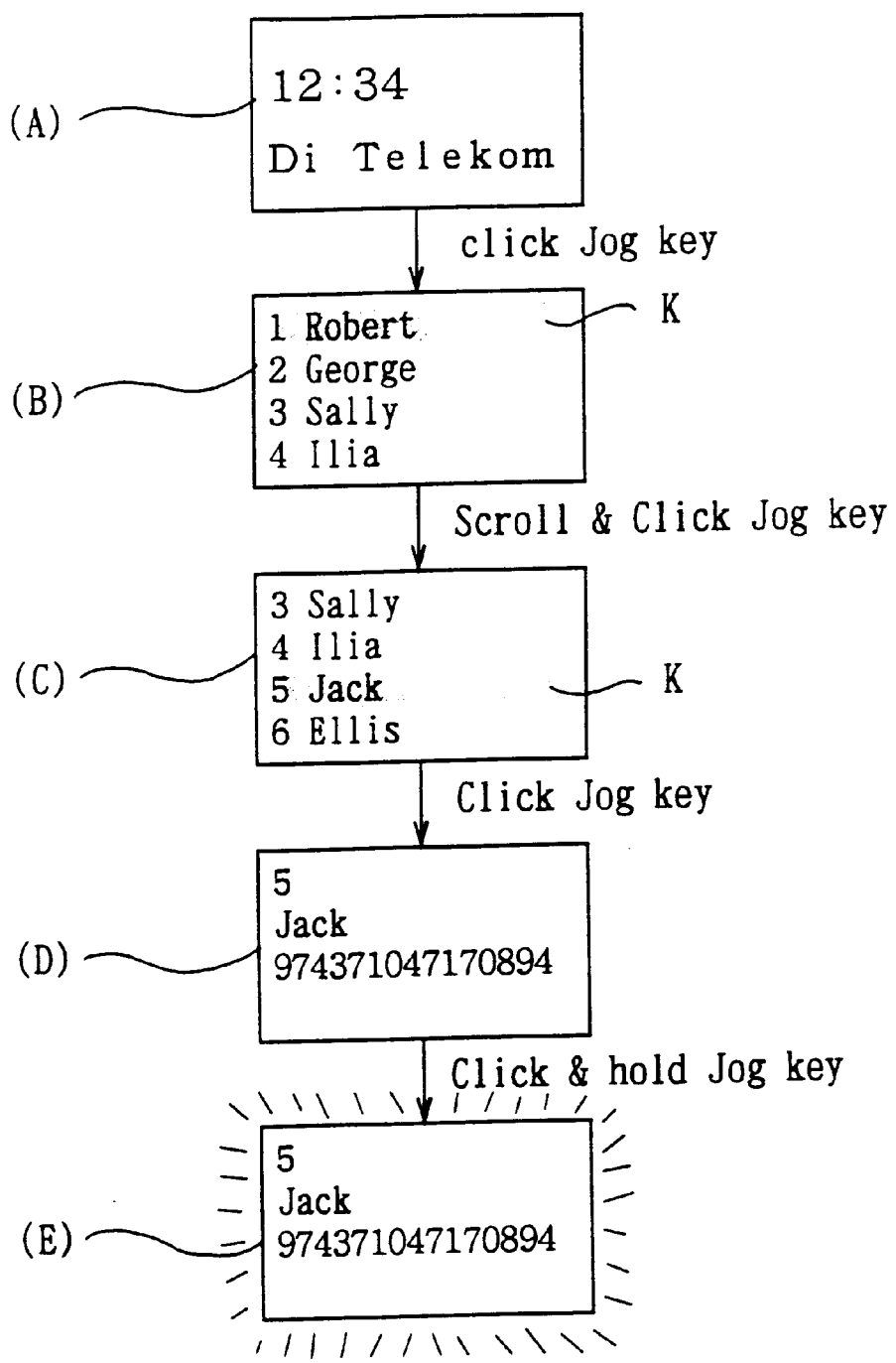
FIG. 20 is a state transition diagram showing a calling procedure from a telephone book list.

When the jog dial 36J is clicked while the arm microphone 33 is open, or while an external microphone is connected to the main body 32, or while a hands free kit is connected to the main body 32, the display on the display unit 35 is switched from the initial screen shown in (A) of FIG. 20 to screen of the telephone book list shown in (B) of FIG. 20.

Figures 21, 22:
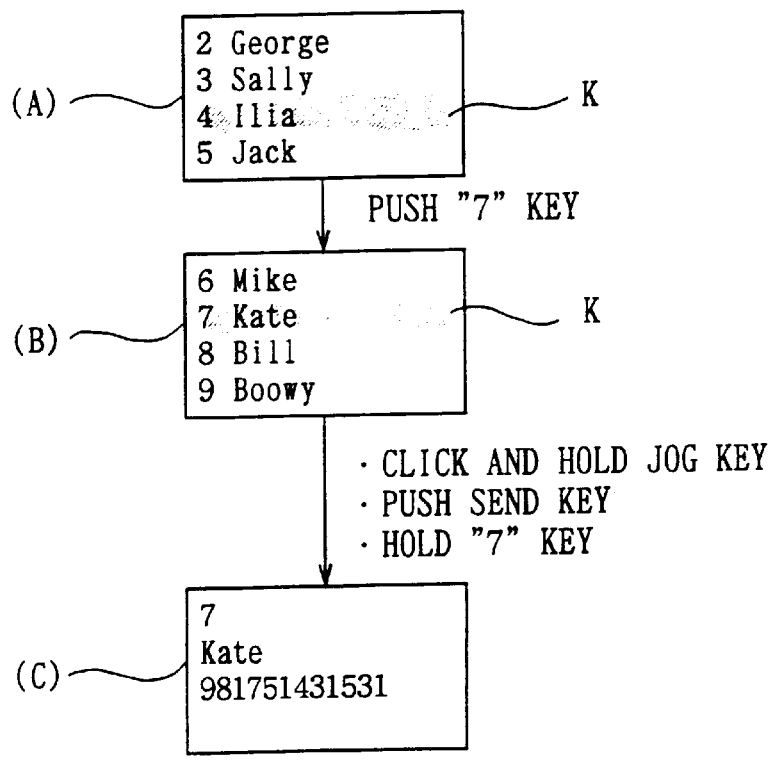
FIG. 21 is a diagram showing the arrangement of characters in the telephone book list.
FIG. 22 is a state transition diagram explaining retrieval using numeric keys.

As shown in FIG. 21, the telephone book list is composed of display section of call frequency in which sets of address numbers "1" to "9" and registered communicatees with high frequency of call are displayed, and display section of descending order in which all the registered communicatees (including those already registered with address numbers "1" to "9") in the descending order (for example, the alphabetical order). The telephone book list is input by aforementioned numeric keys 6B, and is stored in memory area in the controller 47 or in memory area in the RAM 49. The telephone book list is read out from the memory area in the controller 47 or the memory area of the RAM 49 based on the control signal from the controller 47 to display.

Immediately after the display is switched to the telephone book list, the cursor K is located at the top of the items displayed on the display unit 35, that is, address number "1". The downward rotation of the jog dial 36J in this state enables the cursor K to sequentially move downward through the address numbers, such as "2", "3", . . . On the other hand, while upward rotation of the jog dial 36J enables the cursor K to sequentially move upward from the bottom item in the display sections of descending order, such as Z, Y, X, . . .

The method for selecting a communicatee by moving of the cursor K includes not only operation with the jog dial 36J, but also selection methods by inputting address numbers or alphabets. If, for example, the telephone number of a communicates is already registered with any of the address numbers "1" to "9" and address number is known, it is possible to make the cursor K jumped by pressing the numeric key corresponding to that address number. An example is shown in FIG. 22.

If the list screen is an alphabetical display screen, the cursor K can be moved to the corresponding alphabet by the "1" to "9" numeric keys. For example, pressing "2" enables the cursor K to move to "a", and pressing "3" enables the cursor K to move to "d". If there is no name starting with "d", the cursor K moves to a name staring with "e" to display it. Further, if there is no name starting with "e", the cursor K moves to the top of the subsequent names in the list.

Subsequent calling procedure is described assuming that the cursor K is to be moved to the position of "Jack" registered with address number "5" as shown in FIG. 20C. There is a plurality of calling procedures. Here, a method using the jog dial 36J is described.

When the jog dial 36J is clicked in this state, the controller 47 switches the display screen to the display section of detailed information based on the output signal from the switch SW of th jog dial 36J, as shown in (D) of FIG. 20. When the jog dial is further clicked for one second, the controller 47 counts continuation time of the output signal from the switch SW of the jog dial 36J, as described above, and starts calling. A data of a telephone number designated by the cursor K, for example, corresponding to the address number "5", is read out from the memory area in the controller 47 or the exclusive area in the RAM 49, and is transmitted from the transmitting/receiving circuit 40, so that the calling operation is performed. At this point, the display screen of the display unit 35 flashes, as shown in (E) of FIG. 20.

Figure 23:
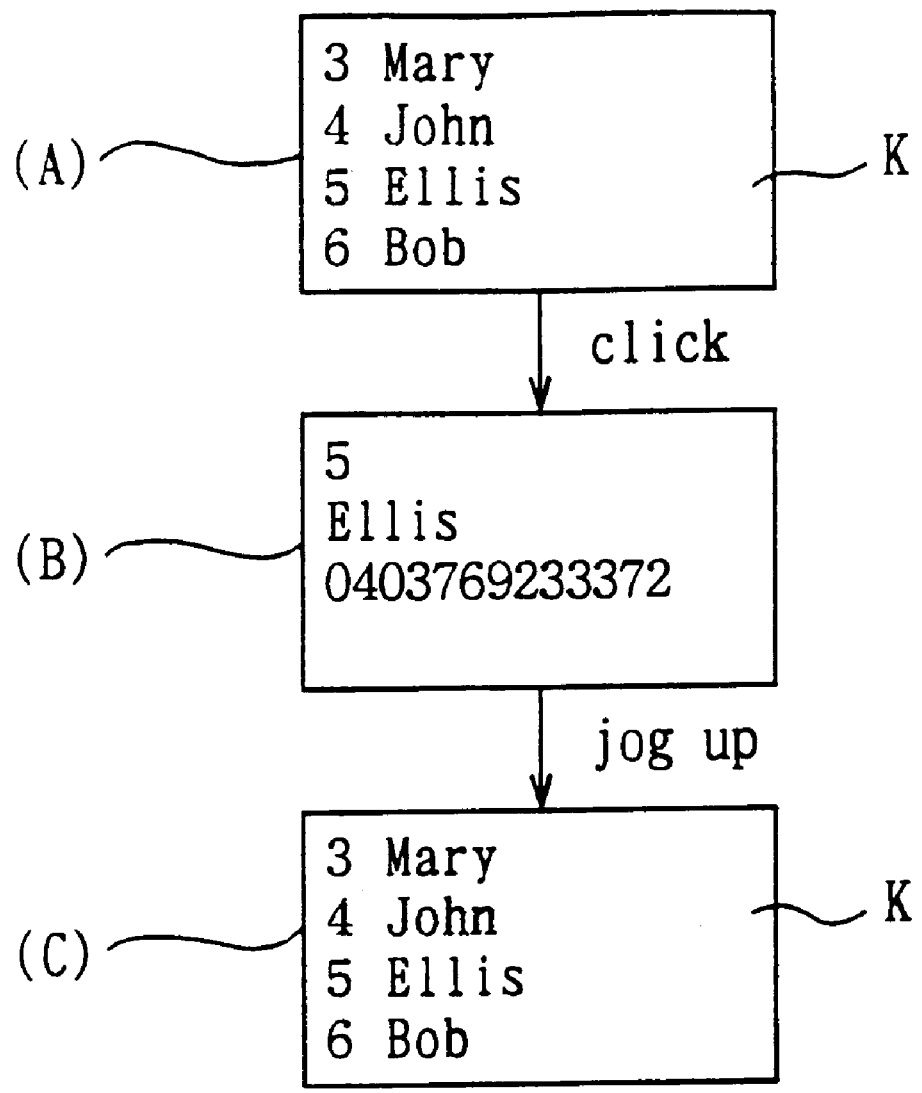
FIG. 23 is a state transition diagram showing a return from a detailed information display screen to a list display screen.

It is possible to change the communicates while detailed information composed of the name or the abbreviation and the telephone number is being displayed on the display unit 35, as shown in (D) of FIG. 20, by rotating the jog dial 36J upward or downward. If, for example, the jog dial 36J is rotated upward while the detailed information is displayed on the display 35 as shown in (B) of FIG. 23, the display as (C) of FIG. 23 can be returned to the list screen belonging to the upper layer directly above the detailed information screen. The position of the cursor K is, however, moved to the item directly above the communicates of which the detailed information has been displayed. More specifically, the cursor K moves from "Ellis" with address number "5" to "John" with address number "4", as shown in (C) of FIG. 23. The switching operation of the display is performed by changing the read-out address to the memory area in the controller 47 or to the exclusive area in the RAM 49 in which the telephone book list is stored, or by changing the telephone book list read out from the memory area in the controller 47 or the exclusive area in the RAM 49 by table.

The function that, if no operation is operated for a specified length of time, for example thirty seconds when, in the state of displaying detailed information, such as shown in FIG. 20(D) a call will not be executed and closes the telephone book list to return to the initial screen shown in (A) of FIG. 20, is provided. The timer in the controller 47 counts or measures the elapsed time from when the jog dial 36J or the keys 36A to 36H was last operated. If the timer in the controller 47 detects that the jog dial 36J or the keys 36A to 36H are not operated at the point of time that thirty second has passed, the controller 47 outputs the control signal to switch the display screen on the display 35. Therefore, even if a key capable of initiating a call is inadvertently pressed when the portable telephone apparatus 31 is carried in a bag with a detailed display screen displayed, an erroneous call does not occur. This function also works when the list screen is being displayed.

In addition to the method for initiating a call from the screen of telephone book list, there is another method of pressing the send key 36E while the display screen shown in (D) of FIG. 20 is being displayed. This is a method that a call is initiated after detailed information on the communicatee is displayed, and the portable telephone apparatus 31 also provides a function of initiating a call directly from the list screen. For example, if the send key 36E is pressed while the display screen shown in (C) of FIG. 20 is being displayed, a call to a communicates at which the cursor K is positioned can be immediately initiated. A call can also be immediately initiated by continuously pressing the numeric key corresponding to a communicatee for one second. In these methods, the controller 47 detects the output signal from the send key 36E or detects that the numeric key 36B is pressed for a specified length of time, and controls the transmitting/receiving circuit 40 to initiate a call operation. The method for detecting whether or not the numeric key 36B is press operated for a specified length of time can be executed similar to the aforementioned method for detecting whether or not the jog dial 36J is pressed for a specified length of time.

(2-1-2) Call from a Redial List Screen

Next, a calling operation from a redial list screen are described, as shown in (G) to (J) in FIG. 18. The redial list screen can be opened by pressing the send key 36E in the state of initial screen. That is, when the send key 36E is pressed while the screen shown in (A) of FIG. 18 is being displayed, the names of communicatee previously called (in the case where it is called from the telephone book list) or telephone numbers previously called (in the case where the telephone numbers are directly input) are displayed as shown in (G) of FIG. 18. Subsequent operations of selecting a communicatee and calling operation are similar to calling from the telephone book list.

The function that, if no operation is executed for a specified length of time (thirty seconds) while the list shown in (G) of FIG. 18 is being displayed, determines that a call will not be executed, and closes the telephone book list to return to the initial screen shown in (A) of FIG. 18, is provided. This operation is controlled by the controller 47 similar to the case of (D) of FIG. 20. This prevents an erroneous call if a key capable of initiating a call is inadvertently pressed when the portable-telephone apparatus 31 is carried in a bag with a detailed display screen displayed.

The portable telephone apparatus 31 also provides a function of displaying how long the user talked in the preceding communication, and information of the communication periods of time of this time to the communicatee. For example, the preceding communication period of time is displayed as "4:25" as shown in (H) of FIG. 18, and the communication period of time of this time is displayed as "0:00:55" as shown in (J) of FIG. 19.

(2-1-3) Call by Input of a Telephone Number

In this case, the telephone number of a communicatee can be input in the state of initial screen shown in (A) of FIG. 18 using the numeric key 36B. Then, the display screen shifts from the state shown in (A) of FIG. 18 to another state shown in (K) of FIG. 18 to display the telephone number input by the user on the display 35 in the large font. In the case where the number is correct, if the send key 36E is pressed, the screen starts flashing as shown in (L) of FIG. 19 and a call to the communicatee is initiated. This function is executed in such a manner that the controller 47 controls the transmitting/receiving circuit 40 based on the input data from the numeric key 36E using the input from the send key 36E as the trigger.

(2-1-4) Call by Abbreviated Dialing

This calling method includes two types: one of them is to continuously press the numeric key 36B for a specified length of time, and the other is to use the numeric key 36B and the "#" key.

First, the method of using only the numeric key 36B ((O) and (P) of FIG. 19) is described. While the display screen shown in (A) of FIG. 18 is being displayed, the user continuously presses for, for example, one second the numeric key 36B corresponding to the address number of a communicatee that the user wants to call. This operation causes the screen displayed on the display 35 to immediately switch to the detailed information screen, and a call is directly initiated. This function is executed in such a manner: when the numeric key 36B corresponding to the address number is operated, the controller 47 reads out the data corresponding to the numeric key 36B from the memory area in the controller 47 or the exclusive area in the RAM 49, and then controls the transmitting/receiving circuit 40 based on the data read out.

Next, the method of using both the numeric key 36B and the "#" key 36C ((Q) of FIG. 18 to (S) of FIG. 20) is described. After pressing the numeric key 36B corresponding to the address number of a communicatee on the screen shown in (A) of FIG. 18 that the user wants to call, the user presses the "#" key 36C to switch to a detailed display screen. The send key 36E is then pressed in this state, so that a call can be initiated. This operation is also executed by which the controller 47 controls the transmitting/receiving circuit 40 taking similar steps to the call operation by the short dial using the numeric key 36B.

(2-1-5) Registration/Editing

Next, methods for registering and editing telephone numbers in the telephone book list are described. First, by pressing the menu key 36G, a menu screen is opened. Then, "Telbook edit" is selected from the screen to enable telephone numbers and so on to be registered. Two registration methods are then possible. On the one hand, there is a method for specifying the "new registration" item to input a new telephone number. When registering a new communicates, the user operates the jog dial 36J to move the cursor K to the "new registration" item, and then clicks the jog dial 36J ((B) of FIG. 24).

Figure 24:
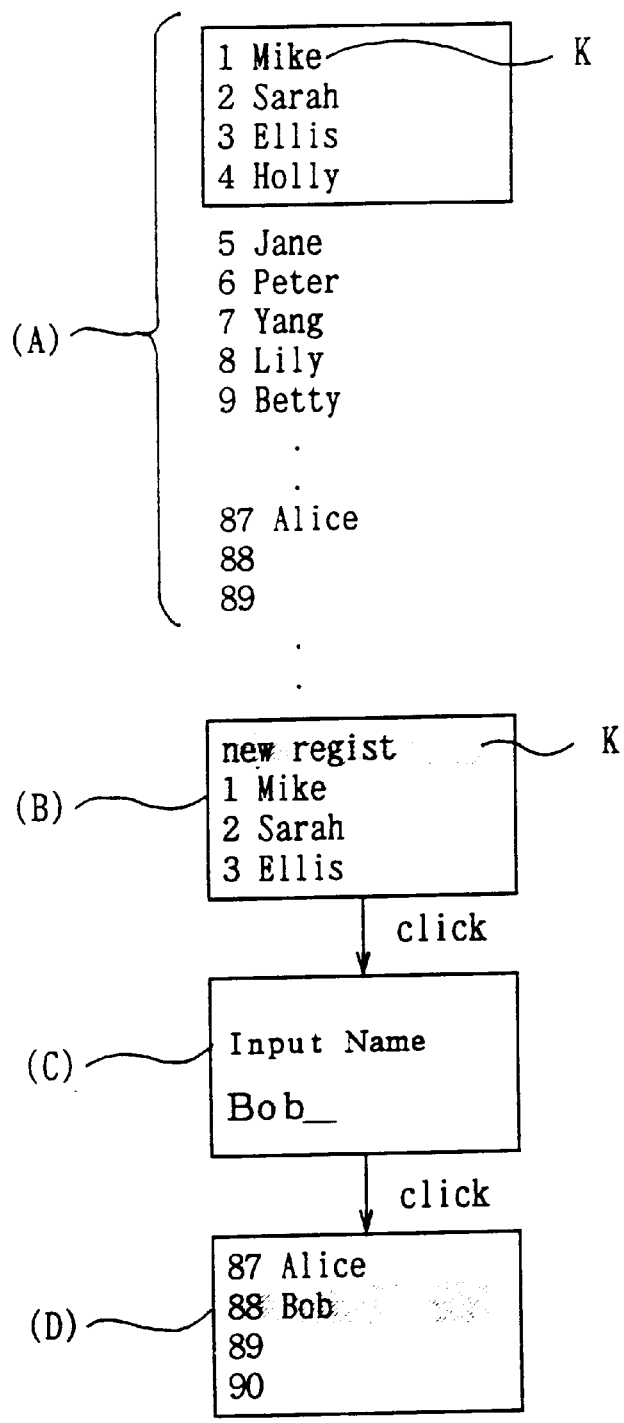
FIG. 24 is a state transition diagram showing an example of a registration procedure of a new record on a telephone book list screen.

Then, the display screen switches to (C) of FIG. 24 to display characters prompting to input a name. When the user then operates the numeric keys 36B, the input characters are displayed on the display 35 as alphabets in the large font. Here, if it is alright to register the input name, the user clicks the jog dial 36J to shift to a subsequent registration screen of the telephone number. The user inputs a telephone number, and, if it is alright to register the input number, again clicks the jog dial 36J. The new input name and so on is then registered in an empty area in the telephone book list, as shown in (D) of FIG. 24.

Figure 25:
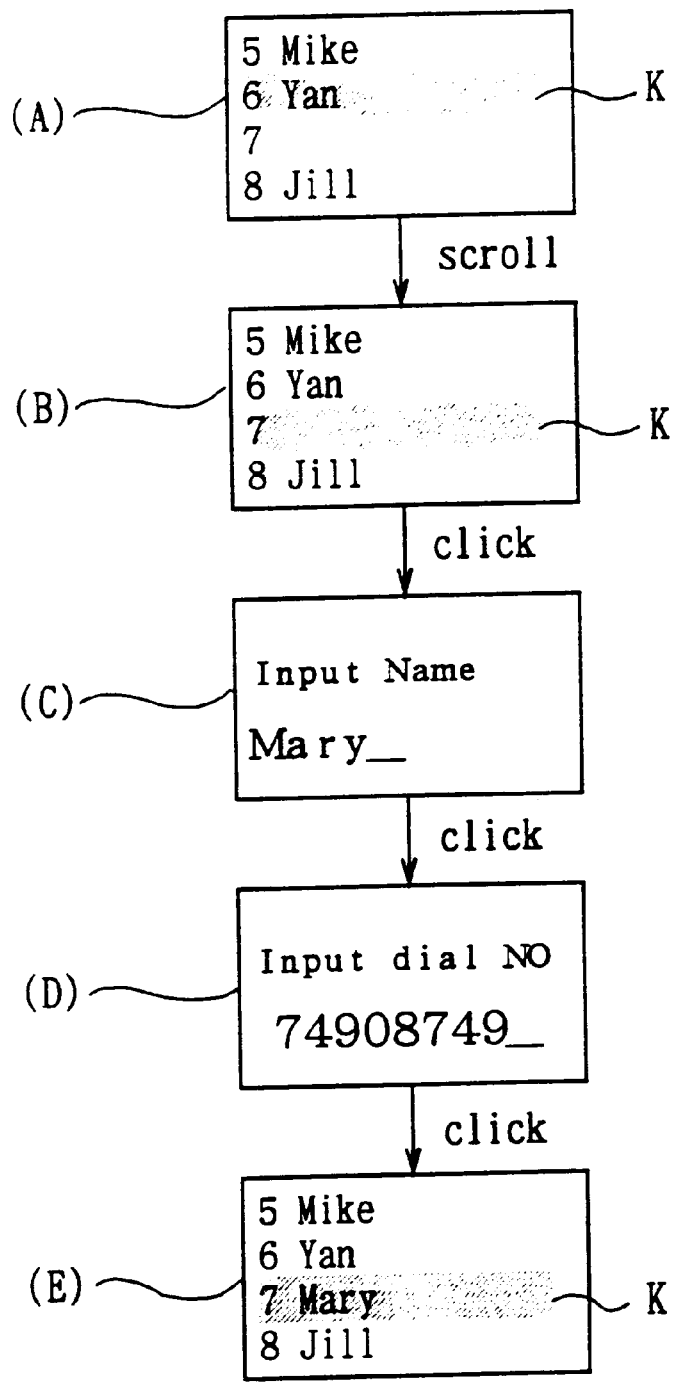
FIG. 25 is a state transition diagram showing an example of a registration procedure of a new record on the telephone book list screen.

On the other hand, there is a method for selecting an unregistered address number to register a name. In this case, the cursor K is moved to an unregistered address number, as shown in (A) and (B) of FIG. 25. In this embodiment, the number is "7". When the jog dial 36J is clicked in this state, characters prompting to input a name is displayed on the display 35.

The corresponding numeric keys 36B are then operated to input a communicatee's name, and, if the name is correct, the user clicks the jog dial 36J to register, as in the registration procedure described above. A telephone number is then input according to an instruction displayed on the screen as shown in (D) of FIG. 25, and the user can register the input telephone number by clicking the jog dial 36J. These are the registration procedures of the telephone book list. The data concerning the telephone book list registered in such a manner is stored in the memory area in the controller 47 or the exclusive area in the RAM 49.

Figure 26:
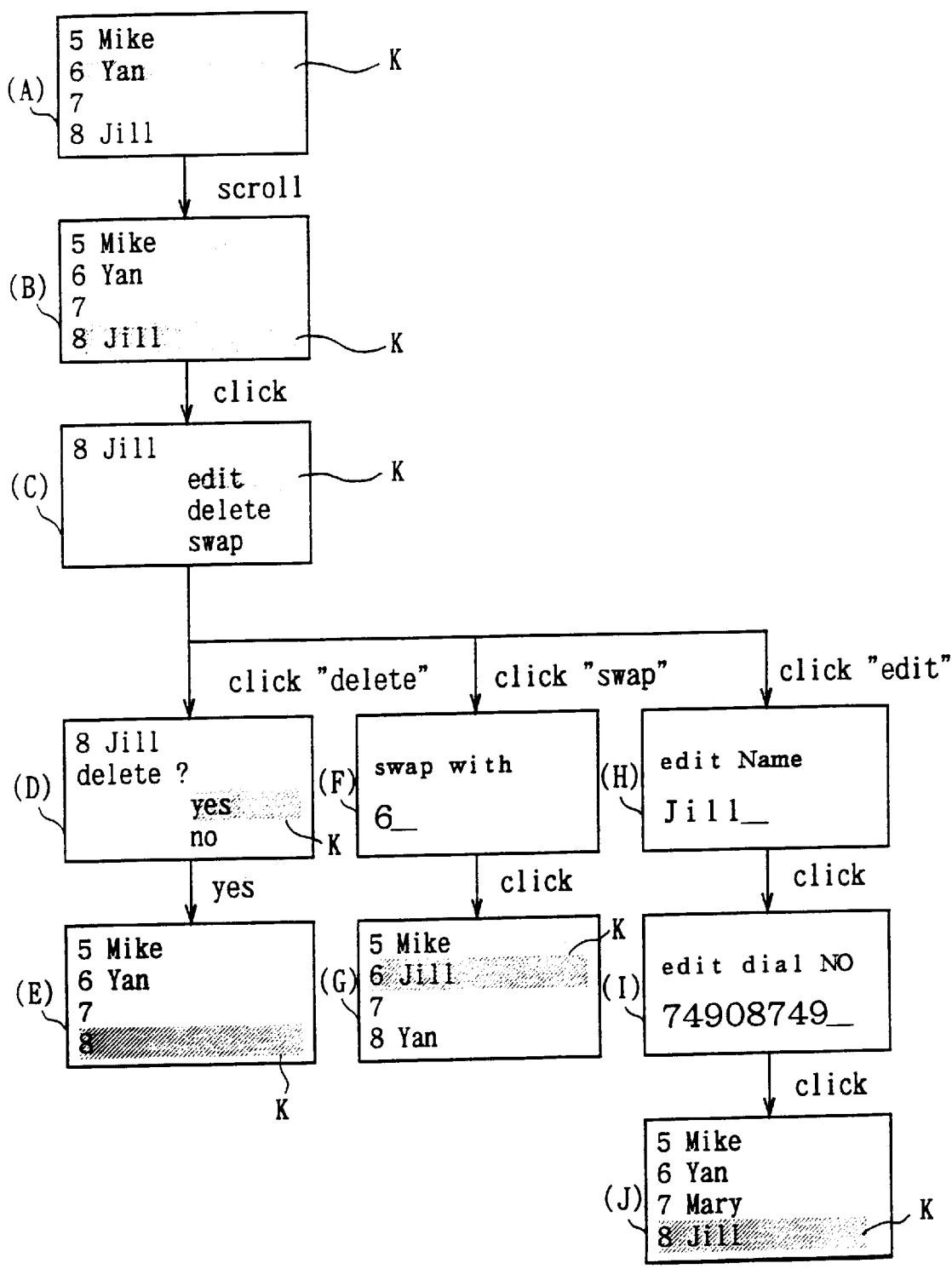
FIG. 26 is a state transition diagram showing a editing procedure of a display screen displayed on the telephone book list screen.

On the other hand, for editing, the cursor K is moved onto a name to be edited and the jog dial 36J is then clicked, as shown in (A) and (B) of FIG. 26. When a registered item is selected in this manner, the apparatus enters an editing mode. In the editing mode, the communicatee's name to be edited and the contents of edition (edit, delete, or swap) are displayed on the screen. The user then operates the jog dial 36J to select the contents of editing.

If, for example, "delete" is selected, the display screen becomes a confirmation screen to ask the user again whether or not the registered contents may be deleted, as shown in (D) of FIG. 26. If "Yes" is selected, a delete operation is executed which deletes a corresponding part from the telephone book list.

If "swap" is selected, the display screen is switched to the (F) of FIG. 26 prompting the user to indicate which address number should have its contents swapped. When an address number to be swapped is input and the jog dial 36J is then clicked, a swap operation is executed and the registered contents after swapping is displayed, as shown in (G) of FIG. 26. In this embodiment, "8" is swapped with "6".

If "edit" is selected, screens that accept a change in communicatee's name or telephone number are alternately displayed in order that both items can be changed, as shown in (H) and (I) of FIG. 26. When the jog dial 36J is then clicked to confirm the contents to be changed, the display screen switches to (J) of FIG. 26.

As a result of the edit operation performed in the aforementioned manner, the data of the telephone book list stored in the memory area in the controller 47 or the exclusive area in the RAM 49 is rewritten, as described above. Incidentally, it may be possible to expand stored data of the telephone book list once in the RAM of the controller 47 while operating edit operation, and then rewrite the data of the telephone book list when the edit operation is finished.

(3) Menu Screen (3-1) Contents of Items

Finally, the menu screen displayed when the menu key 36G is press operated is described. The menu screen has a hierarchical structure such that it can descend to the next lower layer (submenu screens) by click operating the jog dial 36J. Here, FIG. 27 shows menu screens W1 to W10 in the highest layer prepared for the portable telephone apparatus 31, and FIGS. 28, 29, 30, and 31 shows submenu screens belonging to the lower layer.

Figure 27:
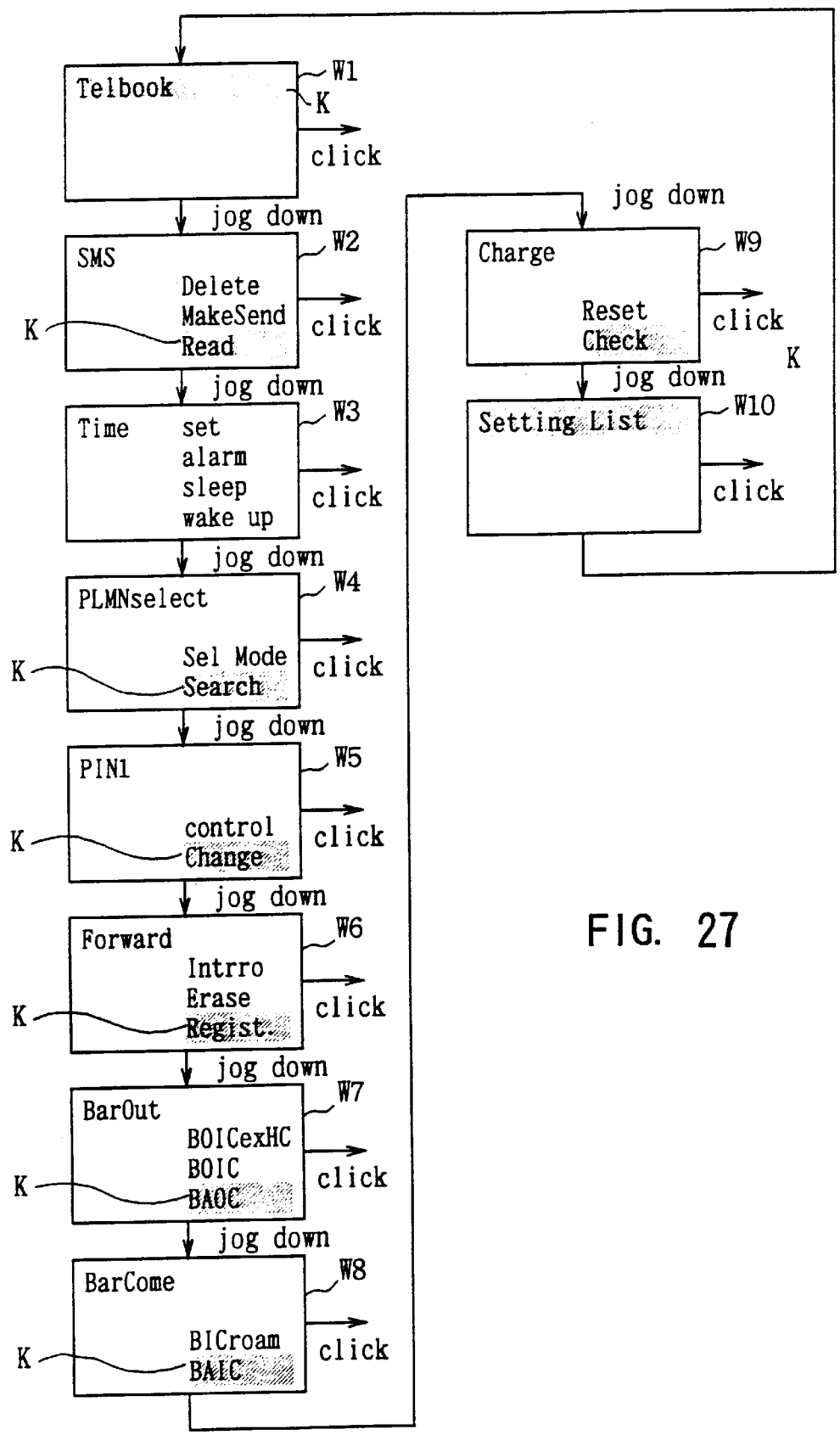
FIG. 27 is a state transition diagram showing a menu list screen.

The first menu screen W1 shown in FIG. 27 is used to edit the "Telbook (telephone book)" and to set the "mode". By selecting of the "Telbook" item, a new telephone number can be registered or registered contents can be edited. On the other hand, if the "mode" item is selected, the display is switched to the menu screen shown in (A) of FIG. 28 so that the setting conditions suitable for the use environment can be selected. In this embodiment, four use environments are available for selection: a "normal mode", a "pocket mode", a "silent mode", and a "driving mode".

Figure 28:
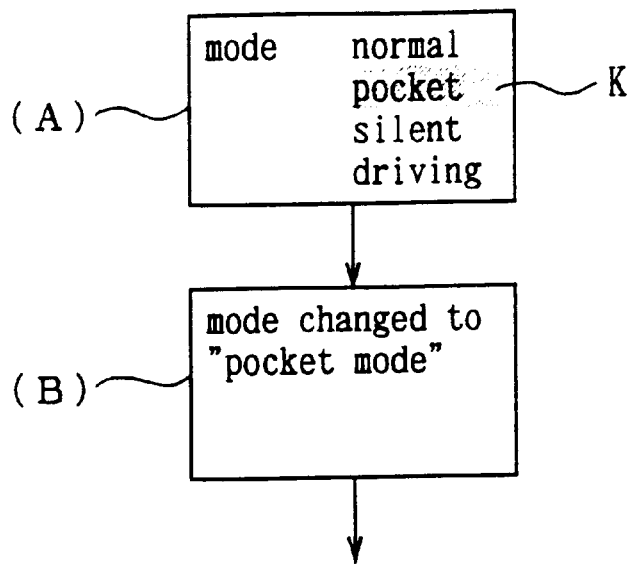
FIG. 28 is a state transition diagram showing a detailed display screen of a mode setting screen.

For example, when the pocket mode is selected as shown in (B) of FIG. 28, the volume of a ring can be maximized (ringer on) and further the key lock function can be activated. Therefore, even if the portable telephone is used under the condition which is hard to hear the ring, the user can catch the ring, and further the key inputs irrelevant to operation can be rejected.

When the silent mode is selected in (A) of FIG. 28, the ring can be absorbed (ringer off), and the display 35 is flashed to inform the user of an incoming call instead of the ring. Therefore, the user can know of an incoming call without bothering people around the user even in a train. A function for automatically ringing off the line when no response is issued is also set during this mode.

When the driving mode is selected, the user can start communications automatically upon an incoming call.

Figure 32:
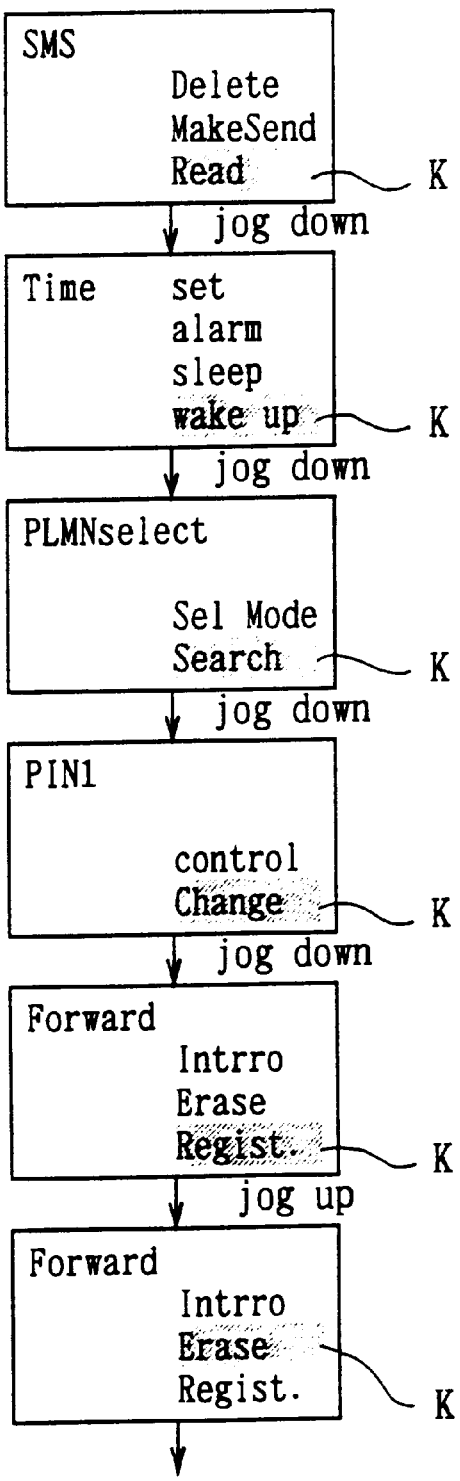
FIGS. 32 and 33 are state transition diagrams explaining a scroll function.

The second menu screen W2 in FIG. 27 is used to set a "SMS (short message function)". This menu screen displays three items as shown in FIG. 32: "Delete", "Make Send", and "Read". When "Make Send" is selected, it is possible to select at the lower menu screen from the following items: the production of a new sentence to be transmitted; the use of a pattern sentence; the use of a stored sentence that has previously been transmitted; or the use of a stored sentence that has previously been received.

When "Read" is selected, it is possible to select similarly at the lower menu screen from the following items: the storage or deletion of read contents; a reply through a telephone; or a reply with a short message.

The third menu screen W3 in FIG. 27 is used to set a "Time" function. As shown in FIG. 32, by selecting "set", "alarm", "sleep", or "wake up" in this menu screen, the current time, the time to give an alarm, or turning on/off can be set.

The fourth menu screen W4 in FIG. 27 is used to set a "PLMN (Public Landit Mobile Network)" function. This menu screen displays "Selection mode" and "Search" items. The former is used to select whether the network should be set manually or automatically. The latter is the function that automatically retrieves and displays currently available networks.

The fifth menu screen W5 in FIG. 27 is used to set a "PIN (personal ID number)" function. This menu screen displays "control" and "change" items. The former enables the setting of whether or not the input of an ID number should be essential while operating, thus enabling the setting of whether the network can be used only by particular people. The latter enables an ID number to be changed.

The sixth menu screen W6 in FIG. 27 is used to set a "Forward" function. This menu screen displays "Intrro (interrogation)", "Erase", and "Regist (registration)" items. The "Intrro" item is used to inquire about a transfer service to the network, and "Erase" and "Regist" are used to release and set a communicates, respectively.

The seventh menu screen W7 in FIG. 27 is used to set "BarOut (outgoing)" function. This menu screen displays items, "BOIC-exH (Barring of Outgoing International Calls except those directed to the HPLMN Country)", "BOIC (Barring of Outgoing International Calls)", and "BAOC (Barring of All Outgoing Calls)". Selection of each item sets the corresponding outgoing function.

The eighth menu screen W8 in FIG. 27 is used to set an "BarCome (incoming)" function. This menu screen displays items, "BICroam (Barring of Incoming Calls during Roaming except those directed to the HPLMN Country)" and "BAIC (Barring of Incoming Calls)". Selection of each item also enables to set corresponding incoming function.

The ninth menu screen W9 in FIG. 27 is used to set "Charge (charge)" information. This menu screen displays "Reset" and "Check" items. The former is used to reset charge information, and the latter displays the total charge.

Figure 30:
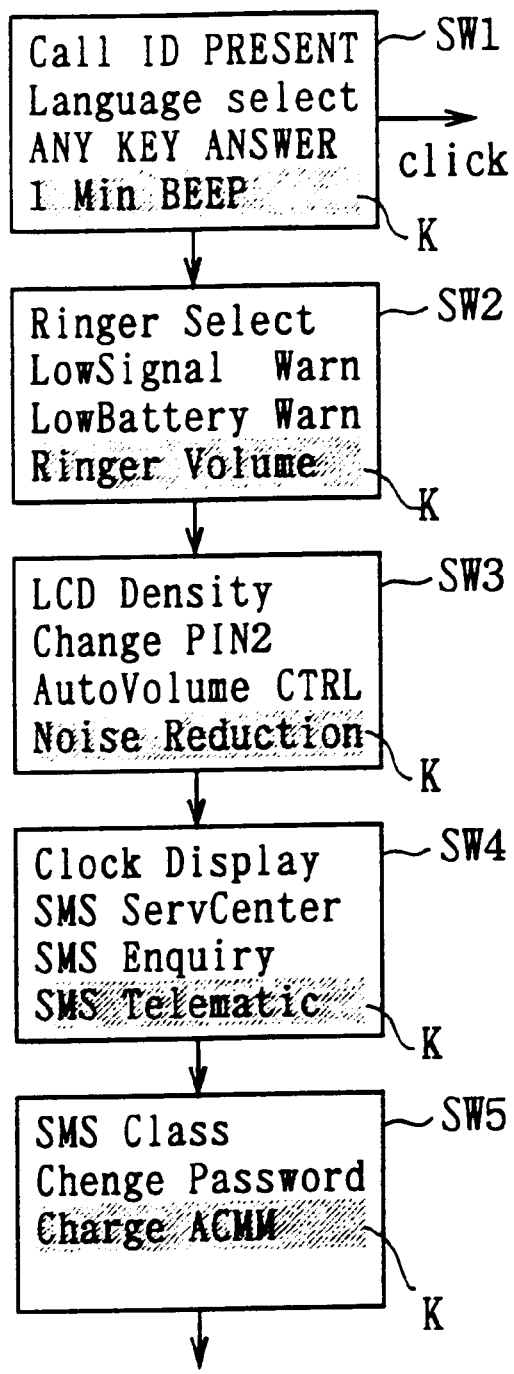
FIG. 30 is a state transition diagram showing a detailed display screen for a ringer setting screen.

The tenth menu screen W10 in FIG. 27 is a "Setting List" screen, in which the various items shown in FIG. 30 can be set. An instruction for the screen next to this menu screen causes a return to the first menu screen W1.

The setting list has five submenu screens in the lower layer, which are sequentially described. The first submenu screen SW1 displays four items: "Call ID PRESENT", "Language select", "ANY KEY ANSWER", and "1 Min BEEP". "Call ID PRESENT" is used to set a function for transmitting the user's telephone number to a communicatee. "ANY KEY ANSWER" is used to set a function which communications can be carried out even if any key is pressed after an incoming call is received. "1 Min BEEP" is used to set a function for informing the user of elapsed time by beeping every one minute during communications.

Figure 29:
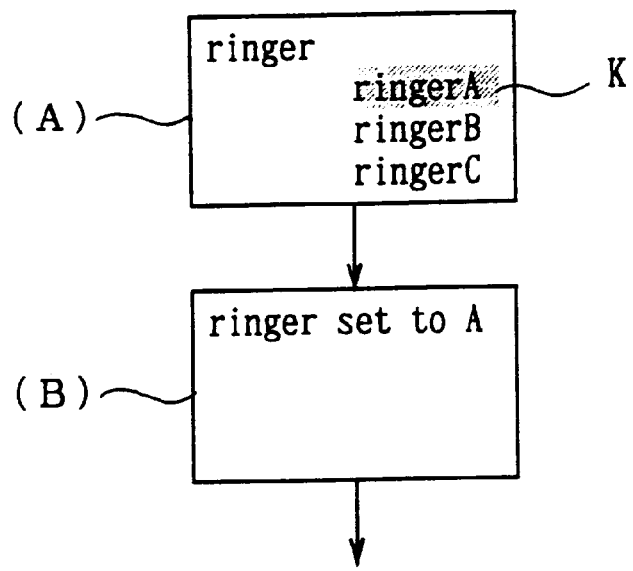
FIG. 29 is a state transition diagram showing a detailed display screen for a various mode setting list screen.
Figure 31:
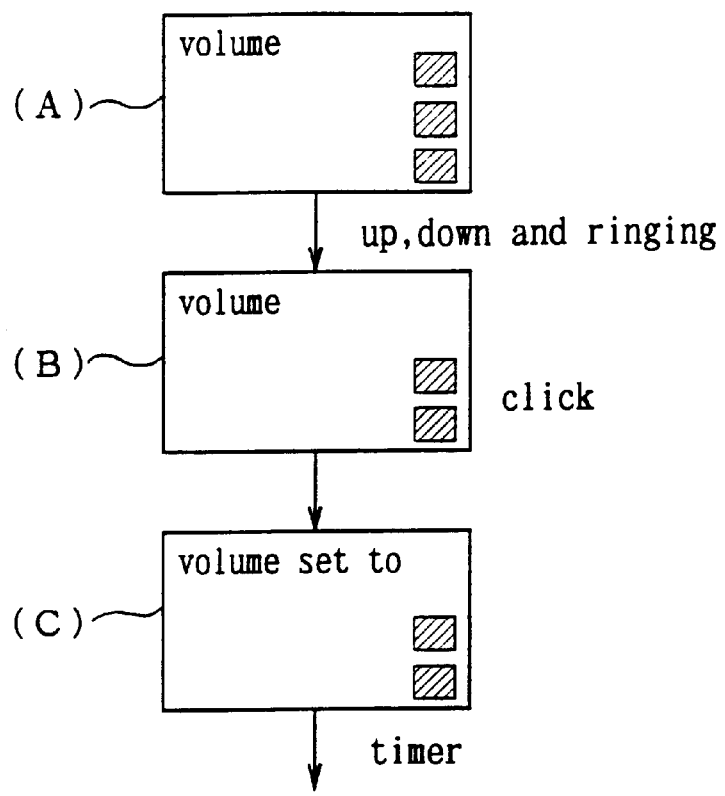
FIG. 31 is a state transition diagram showing a detailed display screen for a volume setting screen.

The second submenu screen SW2 displays four items: "Ringer Select", a "LowSignal Warn (low signal level warning)" function, a "LowBattery Warn (low battery warning)" function, and a "Ringer Volume". "Ringer Select" is used to select one ring sound from three ring sounds as shown in FIG. 29. "Ringer volume" is used to select an appropriate volume from three-level volumes as shown in FIG. 31.

The third submenu screen SW3 displays four items: "LCD Density" used for setting brightness, "Change PIN2" used for changing a personal ID number, and "AutoVolume CTRL" that automatically increase the volume when there are a large amount of background noises, and "Noise Reduction".

The fourth submenu screen SW4 displays four items: "Clock Display" used for determining whether or not the time should be displayed on the display 35, "SMS Serv-Center" used for changing the address of a service center, "SMS Enquiry" that determines whether or not to show if a message has reached a communicatee, and "SMS Telematic" that determines whether or not a short message should be sent to a facsimile terminal equipment.

The fifth submenu screen SW5 displays three items: "SMS Class" for weighing a short message according to its importance, "Change Password" used for changing a password that regulates incoming and outgoing calls within an additional service, and "Charge ACMM" used for setting a function for restraining outgoing calls that exceed a certain upper limit.

(3-2) Scroll Function

Figure 34:
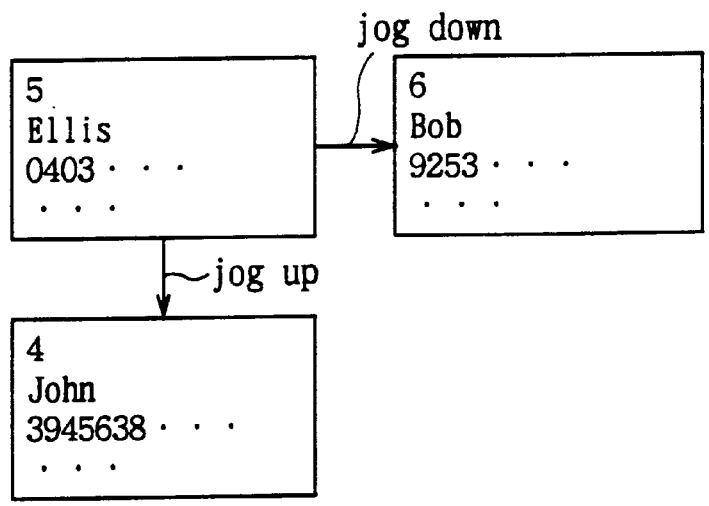
FIG. 34 is a state transition diagram showing an example of switching from a detailed information display screen to another screen.
Figure 33:
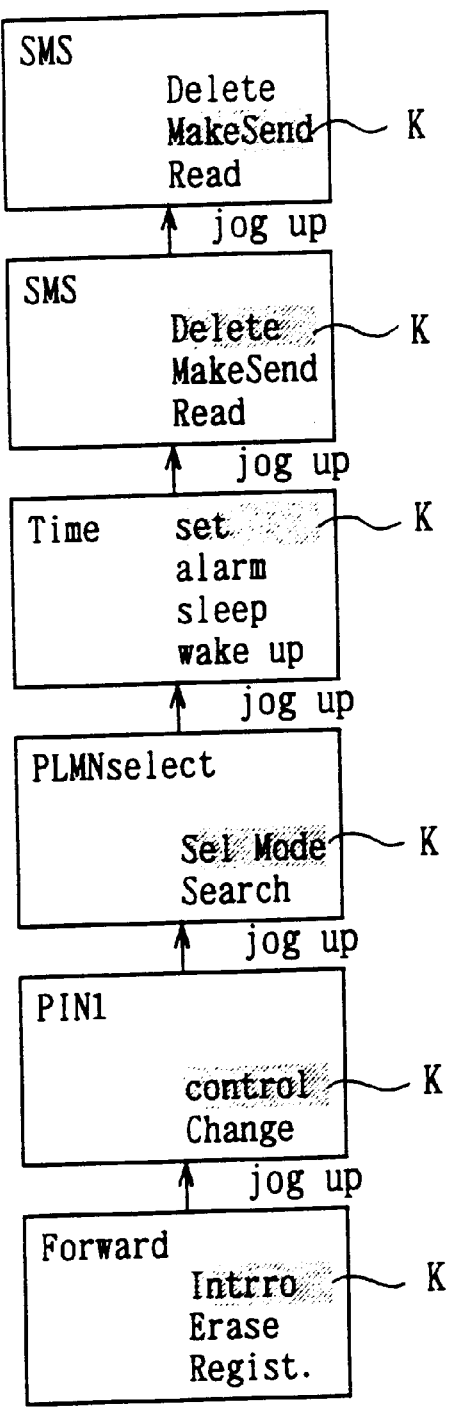

Next, a scroll function used for the portable telephone apparatus 31 to switch among a plurality of menu or submenu screens belonging to the same layer at a high speed is described in FIGS. 33 and 34.

With this scroll function, when upward movement of the cursor K is instructed while being located at the top of the items in each page, it is possible to switch the display the preceding page, and also move the cursor K to the top of the newly displayed items. In addition, when downward movement of the cursor K is instructed while being located at the bottom of the items in each page, it is possible to switch the display to the following page, and also move the cursor K to the bottom of the newly displayed items.

Therefore, the cursor K can be moved at a high speed even when an item displayed on a very remote menu screen is to be selected.

(4) Other Embodiments

In the second embodiment described above, the jog dial 36J having a rotation and a click mechanisms is used as an input apparatus for moving the cursor K and deciding an item. However, the present invention is not only limited to this, but is widely applicable to input apparatus having other structure as long as the input apparatus is used in which the operational directions for inputting the movement of the cursor K and confirming a selected item are different.

For example, a jog shuttle in which the rotating angle is limited to a specified value can be used. A track ball or a joy stick with a click mechanism can also be used. Further, a slide switch with a click mechanism can be used. Even if these apparatuses are used, it is possible to realize a communication terminal apparatus with a small number of operation keys and a good portability, as in the second embodiment described above.

In addition, in the second embodiment described above, the movable microphone 33 is provided on the main body 32. However, the present invention is not only limited to this, but is widely applicable to portable telephone apparatuses with microphone fixed.

Furthermore, in the second embodiment described above, the jog dial 36J is operated in the upward and downward directions to move the cursor K upward and downward, respectively. However, the present invention is not only limited to this, but the jog dial 36J can be operated upward and downward to move the cursor K rightward and leftward.

Furthermore, in the second embodiment described above, if the jog dial 36J is operated upward while detailed information from the telephone book list is being displayed, the display screen is switched to a menu screen belonging to the higher layer, that is, the list screen for names of communicatees, and the cursor is moved to the section displayed above the communicatee whose detailed information has been displayed. However, the present invention is not only limited to this, but, as shown in FIG. 34, detailed information on the item directly above can be displayed when the cursor is operated upward, while detailed information on the item directly below can be displayed when the cursor is operated downward. In this case, the clear key 36H can be used to return to the list screen.

Furthermore, in the second embodiment described above, names of communicatees are input to the telephone book list in alphabets. However, the present invention is not only limited to this, but names of communicatees can be input in katakana.

Furthermore, in the second embodiment described above, the jog dial 36J is used to switch from the registration section for displaying names of communicatees with high use frequency to the display section of descending order for displaying names of communicatee in the descending alphabetical order. However, this invention is not only limited to this, but a exclusive operation key or an existing operation key (for example, the "#" key) can be used to switch the display.

Furthermore, in the second embodiment described above, characters and numbers displayed on the display 35 are displayed using two types of fonts. However, the present invention is not only limited to this, but middle size fonts can be used in addition to the large and the small fonts.

Furthermore, in the second embodiment described above, an SIM card is used as an ID card for storing all the management information for a subscriber. However, this invention is not only limited to this, but ID cards that conform to other standards can be used.

Furthermore, in the second embodiment described above, when the jog dial 36J is operated upward while the cursor K is positioned at the top of the items on a page, the cursor K jumps to the top of the preceding page, whereas when the jog dial 36J is operated downward while the cursor K is positioned at the bottom of the items on a page, the cursor K jumps to the bottom of the following page. However, the present invention is not only limited to this, but only the upward or the downward scroll function can be operated.

In addition, the cursor K can be moved to the following page when the jog dial is operated downward wherever the cursor K may be positioned on a page, whereas the cursor K can be moved upward by one item when the jog dial 36J is operated upward. On the contrary, the cursor K can be moved to the preceding page when the jog dial 36J is operated upward wherever the cursor K can be located on a page, whereas it can be moved downward by one item when the jog dial 36J is operated downward.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication terminal apparatus, comprising:
  a body having a principal front surface and a side surface extending in a direction substantially perpendicular to said principal front surface;
  transmitting and receiving means arranged in said body;
  selection operation means having a rotatable disc-like member partially protruding from said side surface of said body, said selection operation means being arranged to be rotated in a first direction, so that said selection operation means is actuated when pressed against said side surface;
  operation detection means for detecting operation of said selection operation means is said first direction and in said second direction;
  storage means for storing data of communicates;
  display means disposed on said principal front surface of said body for displaying a plurality of said communicatees;
  display means disposed on said principal front surface of said body for displaying a plurality of said communicatees read out of said storage means; and control means for controlling said display means so that one of said plurality of said communicatees is selected on said display means in response to a first detection result of said operation detection means when said selection operation means is operated in said first direction, and for controlling said transmitting and receiving means to originate a call to said one of said plurality of said communicatees selected on said display means in response to a second detection results of said operation detection means when said selection operation means is operated in said second direction, wherein said control means controls said transmitting and receiving means to adjust a reception sound volume in response to operating said selection operation means in said first direction during a communication operation.

2. The communication terminal apparatus according to claim 1, wherein said selection operation means is mounted to be clicked upon linear movement in said second direction.

3. The communication terminal apparatus according to claim 1, wherein said control means controls said display means to display information related to said one of said plurality of said communicatees selected on said display means when said selection operation means is initially operated in said second direction, and wherein said control means controls said transmitting and receiving means to originate said call to said one of said plurality of said communicatees selected on said display means when said selection operation means is subsequently operated in said second direction.

4. The communication terminal apparatus according to claim 1, wherein said data of said communicatees includes one telephone number of one of said communicatees.

5. The communication terminal apparatus according to claim 1, wherein said control means controls said display means to display said plurality of said communicatees and a cursor, so that said cursor corresponds to said one of said plurality of said communicatees selected on said display means.

6. The communication terminal apparatus according to claim 5, wherein said selection operation means is operable in said first direction upwardly and downwardly relative to a top edge of said body and wherein, in response to said selection operation means being moved upwardly in said first direction, said cursor is moved to correspond to another one of said plurality of said communicatees displayed contiguous on an upward side of said one of said plurality of communicatees and, in response to said selection operation means being moved downwardly in said first direction, said cursor is moved to correspond to a further one of said plurality of said communicatees displayed contiguous on a downward side of said one of said plurality of said communicatees.

7. The communication terminal apparatus according to claim 1, wherein said control means controls said transmitting and receiving means to adjust a speech sound volume in response to operating said selection operation means.

8. A communication terminal apparatus, comprising:

a body having a principal front surface and a side surface extending in a direction substantially perpendicular to said principal surface;

transmitting and receiving means;

display means mounted on said principal front surface of said body;

storage means for storing a plurality of communicatees arranged in a predetermined sequence;

selection operation means arranged on said side surface of said body for operation by a user in first, second, and third manners;

control means for controlling said display means to display said data of said plurality of communicatees and for selecting one of said plurality of communicatees by scrolling said data of said plurality of communicatees toward and away from ends of said predetermined sequence in response to an operation of said selection operation means in said first manner and said second manner, respectively, and for controlling said transmitting and receiving means to originate a call to said selected one of said plurality of communicatees in response to an operation of said selection operation means in said third manner and to perform a mute operation during said call in response to operating said selection operation means in said third manner.

\* \* \* \* \*